(12) United States Patent
Bang et al.

(10) Patent No.: US 10,802,323 B2
(45) Date of Patent: Oct. 13, 2020

(54) LIQUID CRYSTAL DISPLAY DEVICE

(71) Applicant: Samsung Display Co., Ltd., Yongin-Si, Gyeonggi-Do (KR)

(72) Inventors: Jung Suk Bang, Hwaseong-si (KR); Kwang Soo Bae, Yongin-si (KR); Min Jeong Oh, Gimpo-si (KR); Bo Ram Lee, Seongnam-si (KR); Young Je Cho, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/136,155

(22) Filed: Sep. 19, 2018

(65) Prior Publication Data

US 2019/0187528 A1 Jun. 20, 2019

(30) Foreign Application Priority Data

Dec. 15, 2017 (KR) .................. 10-2017-0173060
Sep. 14, 2018 (KR) .................. 10-2018-0110445

(51) Int. Cl.
*G02F 1/1335* (2006.01)
*G02F 1/1362* (2006.01)
*G02F 1/1343* (2006.01)

(52) U.S. Cl.
CPC .. *G02F 1/133504* (2013.01); *G02F 1/133512* (2013.01); *G02F 1/133514* (2013.01);
(Continued)

(58) Field of Classification Search
CPC ......... G02F 1/136286; G02F 1/133504; G02F 1/134309; G02F 1/133514; G02F 1/133512; G02F 2001/133565; G02F 2001/133507; G02F 1/133526; G02F 2201/121; G02F 2201/123; G02F 2001/133519; G02F 1/133553; G02F 1/13363; G02F 2001/294; G02F 1/29; G09G 3/3688; G02B 5/0278; G02B 27/2214; G02B 27/26;
(Continued)

(56) References Cited

U.S. PATENT DOCUMENTS 6,147,737 A 11/2000 Yachi
6,330,112 B1 * 12/2001 Kaise ................. G02B 27/1033
348/E9.027

(Continued)

FOREIGN PATENT DOCUMENTS

GB 2318201 A 4/1998

OTHER PUBLICATIONS

European Search Report corresponding to European Patent Application No. 18209652.9 dated Feb. 26, 2019 9 pages.

*Primary Examiner* — Shan Liu
(74) *Attorney, Agent, or Firm* — Innovation Counsel LLP

(57) ABSTRACT

A display device may include the following elements: a first substrate; a pixel electrode overlapping the first substrate; a second substrate overlapping the first substrate; a plurality of optical members disposed on the second substrate, having identical structures, and protruding toward the first substrate; an overcoat layer directly contacting the optical members, covering the optical members, and positioned between the first substrate and the optical members; and a liquid crystal layer disposed between the pixel electrode and the overcoat layer. The pixel electrode may define one domain of the liquid crystal layer.

13 Claims, 23 Drawing Sheets

(52) U.S. Cl.
CPC .. *G02F 1/134309* (2013.01); *G02F 1/136286* (2013.01); *G02F 1/133526* (2013.01); *G02F 2001/133507* (2013.01); *G02F 2001/133519* (2013.01); *G02F 2001/133565* (2013.01); *G02F 2201/121* (2013.01); *G02F 2201/123* (2013.01)

(58) Field of Classification Search
CPC .... G02B 3/0031; G02B 3/0056; G02B 3/005; G02B 3/0068; G02B 1/041; H04N 13/0404; H04N 13/0454; H04N 13/0456; H04N 13/0406
USPC .................................. 349/12, 15, 200, 95, 57
See application file for complete search history.

(56) References Cited

U.S. PATENT DOCUMENTS

| | | | |
|---|---|---|---|
| 9,638,960 B2 | 5/2017 | Miyake et al. | |
| 2006/0012739 A1* | 1/2006 | Shibazaki | G02F 1/133526 349/122 |
| 2007/0200975 A1* | 8/2007 | Kamijima | G02F 1/1303 349/95 |
| 2009/0284673 A1* | 11/2009 | Kim | G02F 1/134309 349/33 |
| 2012/0206678 A1* | 8/2012 | Kim | G02F 1/133533 349/106 |
| 2012/0274873 A1* | 11/2012 | Lee | G02F 1/133526 349/62 |
| 2014/0016059 A1* | 1/2014 | Lee | G02B 5/3058 349/46 |
| 2014/0092353 A1* | 4/2014 | Matsushima | G02F 1/133512 349/110 |
| 2015/0042926 A1* | 2/2015 | Akasaka | G02F 1/133526 349/95 |
| 2015/0227004 A1* | 8/2015 | Cho | G02F 1/133707 349/41 |
| 2016/0124265 A1* | 5/2016 | Lee | G02F 1/133528 349/43 |
| 2016/0154280 A1* | 6/2016 | Yang | G02F 1/134309 349/96 |
| 2016/0245983 A1* | 8/2016 | Lien | G02F 1/13362 |
| 2017/0293187 A1 | 10/2017 | Lazo et al. | |
| 2019/0163023 A1* | 5/2019 | Park | G02F 1/133514 |

* cited by examiner

LIQUID CRYSTAL DISPLAY DEVICE

This application claims priority to and the benefit of Korean Patent Application No. 10-2017-0173060, filed on Dec. 15, 2017 and Korean Patent Application No. 10-2018-0110445, filed on Sep. 14, 2018, in the Korean Intellectual Property Office; the disclosures of the Korean Patent Applications are incorporated herein by reference in its entirety.

BACKGROUND

1. Field

The technical field relates to a liquid crystal display (LCD) device.

2. Description of the Related Art

A liquid crystal display (LCD) device typically includes a pair of substrates having field generating electrodes, such as pixel electrodes and a common electrode, and a liquid crystal layer positioned between the two substrates. In operation, voltages are applied to the field generating electrodes to generate electric fields in the liquid crystal layer. The electric fields determine orientations of liquid crystals in the liquid crystal layer to control transmission of incident light. Accordingly, an image is displayed on the LCD.

SUMMARY

Embodiments may be related a liquid crystal display (LCD) for displaying images having satisfactory visibility.

An embodiment may be related a liquid crystal display. The liquid crystal display includes a first substrate on which a plurality of pixels are defined; a pixel electrode which is disposed on the first substrate in each of the pixels; a second substrate which faces the first substrate; a plurality of optical patterns which are disposed on a surface of the second substrate facing the first substrate; an overcoat layer which is disposed on surfaces of the optical patterns facing the first substrate; and a liquid crystal layer which is disposed between the pixel electrode and the overcoat layer, wherein each of the pixels has one domain.

An embodiment may be related to display device. The display device may include the following elements: a first substrate; a pixel electrode overlapping the first substrate; a second substrate overlapping the first substrate; a plurality of optical members disposed on the second substrate, having identical structures, and protruding toward the first substrate; an overcoat layer directly contacting the optical members, covering the optical members, and positioned between the first substrate and the optical members; and a liquid crystal layer disposed between the pixel electrode and the overcoat layer. The pixel electrode may define exactly one domain of the liquid crystal layer. A pixel of the display device includes the pixel electrode without including any other pixel electrode.

The pixel electrode may include a first stem electrode extending in a first direction, a second stem electrode extending in a second direction perpendicular to the first direction, and a plurality of branch electrodes extending from at least one of the first stem electrode and the second stem electrode.

The pixel electrode may correspond to an active area in which light transmittance of a corresponding portion of the liquid crystal layer may be controlled. The branch electrodes may extend in the same direction in 80% or more of the active area.

In a plan view of the display device (e.g., a plan view including a combination of FIG. 2 and one of FIG. 4, FIG. 12, FIG. 16, FIG. 19, FIG. 20, FIG. 21, FIG. 22, and FIG. 23), the optical members may be bar structures disposed parallel to each other.

The optical members may extend perpendicular to the branch electrodes in the plan view of the display device.

Internal angles formed by sidewalls of the optical members and the second substrate each may be 90 degrees or less.

The optical members may extend parallel to the branch electrodes.

Internal angles formed by sidewalls of the optical members and the second substrate each may be greater than 90 degrees.

In a plan view of the display device, the optical members may be spaced from each other in the first direction and in the second direction.

The optical members may include at least one of circular members, elliptical members, and polygonal members in the plan view of the display device.

The display device may include a data line disposed on the first substrate, extending in at least one of the first direction and the second direction, and partially overlapping at least one of the first stem electrode and the second stem electrode.

A refractive index of the optical members may be greater than a refractive index of the overcoat layer.

A first surface of the overcoat layer may be positioned between the first substrate and a second surface of the overcoat later and may be substantially flat.

The display device may include a base layer. A material of the base layer may be identical to a material of the optical members. The optical members may be directly connected to the base layer. The base layer may completely cover a face of the second substrate.

The display device may include a gate line disposed on the first substrate. The display device may include two data line immediately neighboring each other with no intervening data line, intersecting the gate line in a plan view of the display device, and insulated from the gate line. At least one of the two data lines may partially overlap the pixel electrode.

The display device may include a base layer disposed between the second substrate and the optical members. The base layer may be made of the same material as the optical members.

The pixel electrode may include a first stem electrode extending in a first direction, a second stem electrode extending in a second direction perpendicular to the first direction, and a plurality of branch electrodes extending from at least one of the first stem electrode and the second stem electrode.

The optical members may include a plurality of bars disposed parallel to each other. The optical members may extend perpendicular to the branch electrodes. Internal angles formed by the sidewalls of the optical members and the second substrate each may exceed 90 degrees.

The optical members may include a plurality of bars disposed parallel to each other. The optical members may extend perpendicular to the branch electrodes. Internal angles formed by the sidewalls of the optical members and the second substrate each may be less than 90 degrees.

A refractive index of the optical members may be greater than a refractive index of the overcoat layer.

BRIEF DESCRIPTION OF THE DRAWINGS

Each of FIG. 17

Each of FIG. 19, FIG. 20, FIG. 21, FIG. 22.

DETAILED DESCRIPTION

Figure 1:
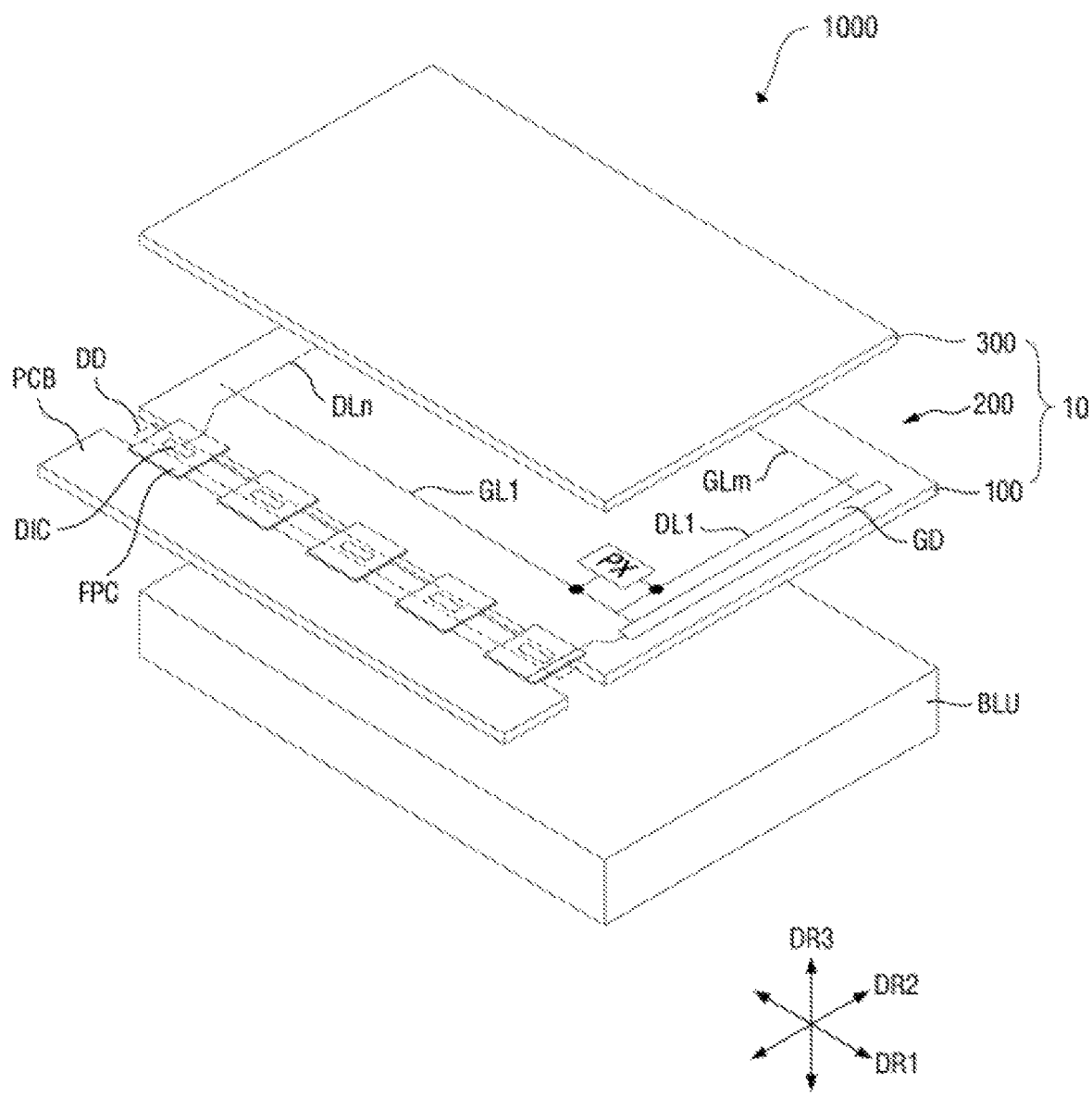
FIG. 1 is a perspective view of a liquid crystal display (LCD) according to an embodiment.

Example embodiments are described with reference to the accompanying drawings. The example embodiments may be embodied in many different forms and should not be construed as being limited. Like reference numerals may refer to like elements in the description.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The term "liquid crystal display" or "LCD" may mean "liquid crystal display device." The term "pattern" may mean "member." The term "insulate" may mean "electrically insulate." The term "connect" may mean "electrically connect."

FIG. 1 is a perspective view of a liquid crystal display (LCD) 1000 according to an embodiment.

Referring to FIG. 1, the LCD 1000 includes a display panel 10, a gate driver GD, a data driver DD, a printed circuit board PCB, and a backlight unit BLU. Each of the display panel 10 and the backlight unit BLU may be shaped like a rectangle having long sides in a first direction DR1 and short sides in a second direction DR2 different from the first direction DR1.

The backlight unit BLU generates light and provides the generated light to the display panel 10. The display panel 10 generates an image using light received from the backlight unit BLU and outputs light for providing the image.

The display panel 10 includes a first display substrate 100, a second display substrate 300 facing the first display substrate 100, and a liquid crystal layer 200 disposed between the first display substrate 100 and the second display substrate 300. A plurality of pixels PX, a plurality of gate lines GL1 through GLm, and a plurality of data lines DL1 through DLn are disposed on the first display substrate 100, where m and n are natural numbers. Although only one pixel PX is illustrated in FIG. 1 for ease of description, a plurality of pixels PX may substantially be defined on the first display substrate 100.

The gate lines GL1 through GLm and the data lines DL1 through DLn are insulated from each other and intersect each other. The gate lines GL1 through GLm extend in the first direction DR1 and are connected to the gate driver GD. The data lines DL1 through DLn extend in the second direction DR2 and are connected to the data driver DD.

The pixels PX are electrically connected to the gate lines GL1 through GLm and the data lines DL1 through DLn intersecting each other. The pixels PX may be arranged in, but not limited to, a matrix form.

The gate driver GD is disposed in a predetermined area adjacent to at least one of the short sides of the first display substrate 100. The gate driver GD may be formed at the same time as transistors of the pixels PX and may be mounted on the first display substrate 100 in the form of an amorphous silicon thin-film transistor (TFT) gate (ASG) driver circuit or an oxide silicon TFT gate (OSG) driver circuit.

In embodiments, the gate driver GD may be composed of a plurality of driver chips and may be mounted on a flexible printed circuit board and then connected to the first display substrate 100 using a tape carrier package (TCP) method. In an embodiment, the gate driver GD may be composed of a plurality of driver chips and may be mounted on the first display substrate 100 using a chip on glass (COG) method.

The data driver DD includes a plurality of source driver chips DIC. The source driver chips DIC are mounted on flexible printed circuit boards FPC and then connected to a predetermined area, which is adjacent to one of the long sides of the first display substrate 100, and the printed circuit board PCB. That is, the data driver DD is connected to the first display substrate 100 and the printed circuit board PCB using the TCP method. In embodiments, the source driver chips DIC of the data driver DD can be mounted on the first display substrate 100 using the COG method.

A timing controller (not illustrated) is disposed on the printed circuit board PCB. The timing controller may be mounted on the printed circuit board PCB in the form of an integrated circuit chip and connected to the gate driver GD and the data driver DD. The timing controller outputs a gate control signal, a data control signal, and image data.

The gate driver GD receives the gate control signal from the timing controller through a control line (not illustrated). The gate driver GD may generate gate signals in response to the gate control signal and sequentially output the generated gate signals. The gate signals are provided to the pixels PX on a row-by-row basis through the gate lines GL1 through GLm. As a result, the pixels PX can be driven on a row-by-row basis.

The data driver DD receives the image data and the data control signal from the timing controller. The data driver DD generates and outputs analog data voltages corresponding to the image data in response to the data control signal. The data voltages are provided to the pixels PX through the data lines DL1 through DLn.

The pixels PX receive the data voltages through the data lines DL1 through DLn in response to the gate signals received through the gate lines GL1 through GLm. The pixels PX display gray levels corresponding to the data voltages, thereby displaying an image.

The backlight unit BLU may be an edge type backlight unit or a direct type backlight unit.

The specific structures of the pixels PX and the display panel 10 will now be described below.

Figure 2:
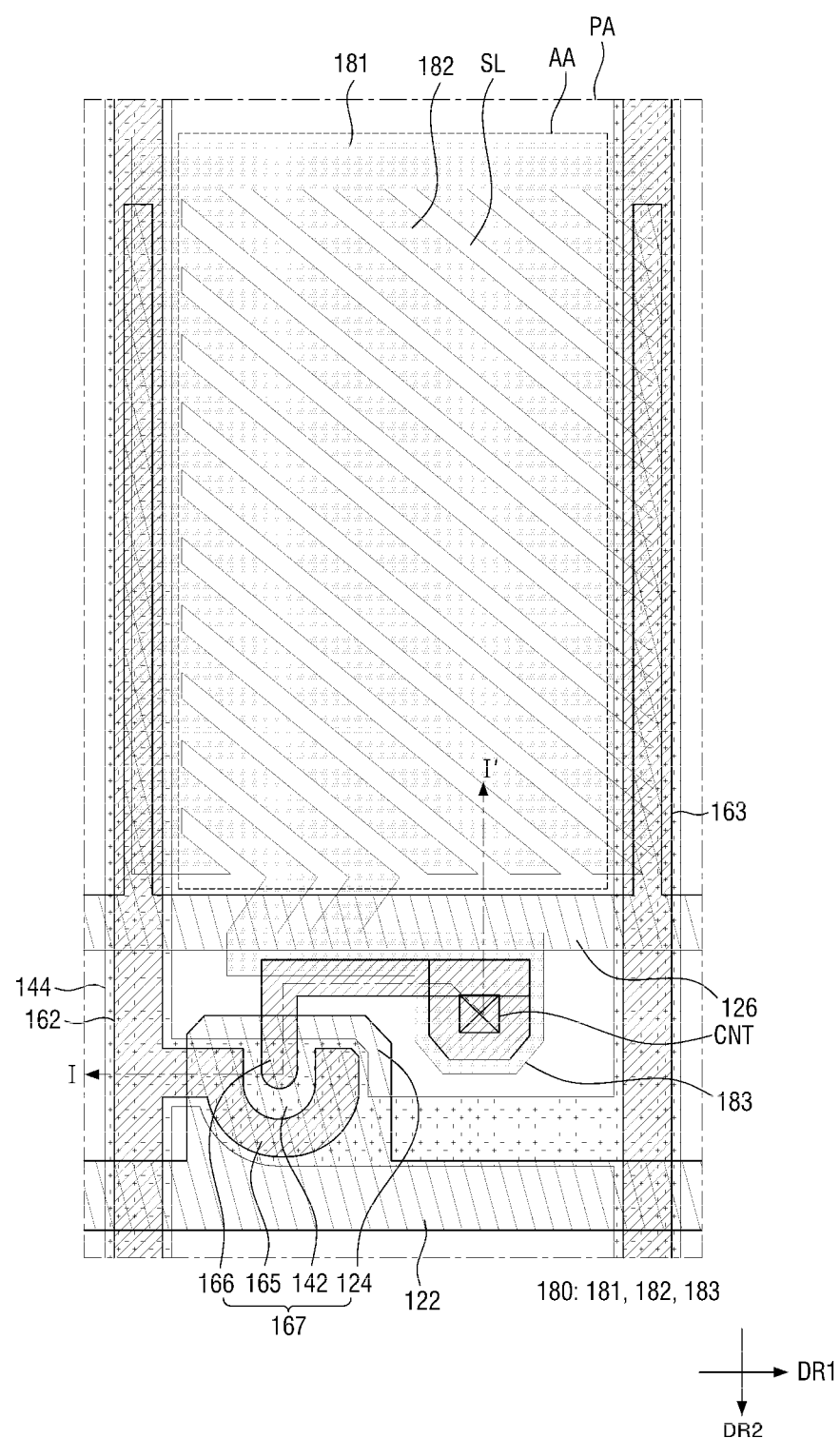
FIG. 2 is a schematic layout view (or plan view) of a pixel illustrated in FIG. 1 according to an embodiment.
Figure 3:
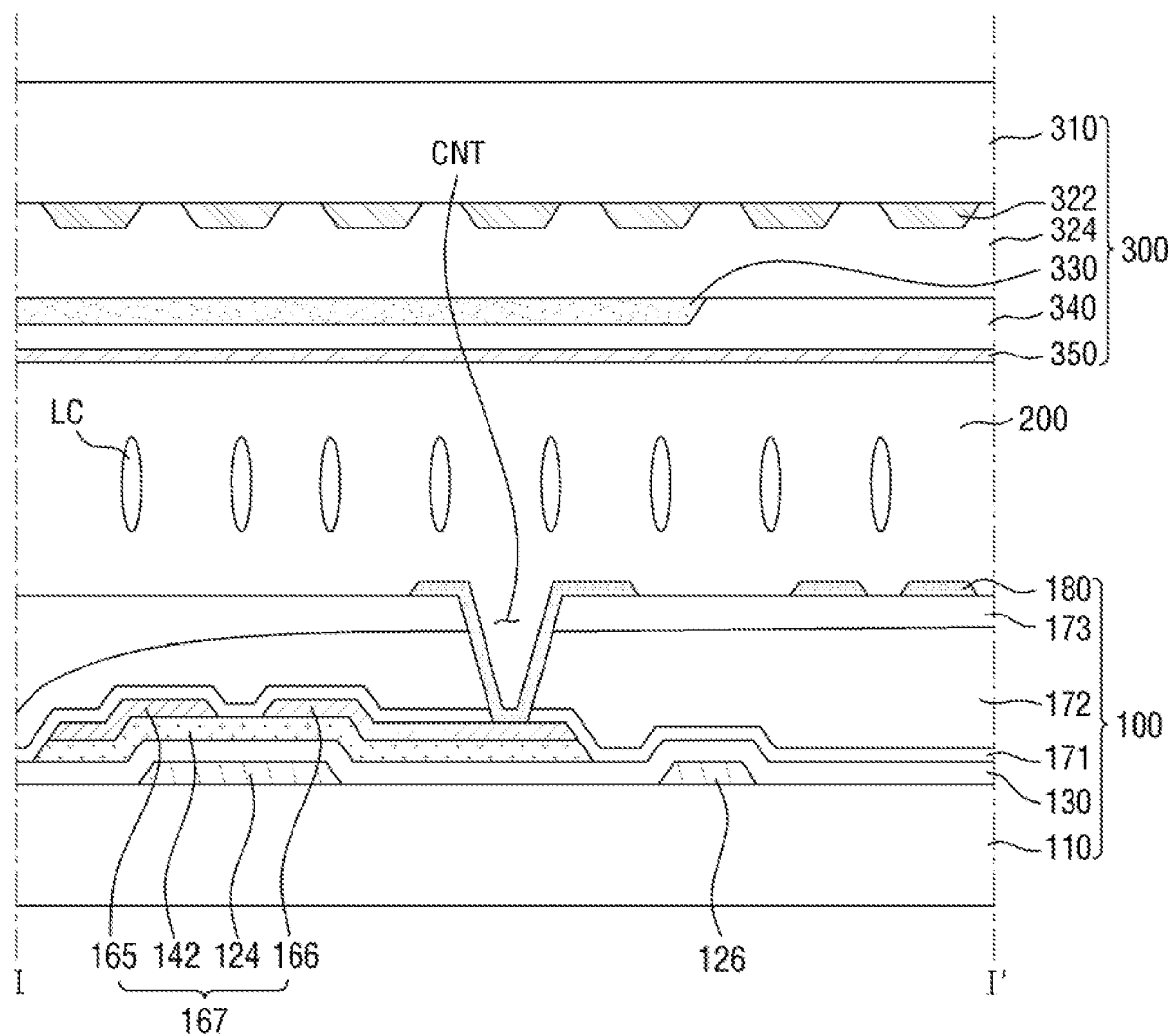
FIG. 3 is a cross-sectional view taken along the line I-I' of FIG. 2 according to an embodiment.
Figure 4:
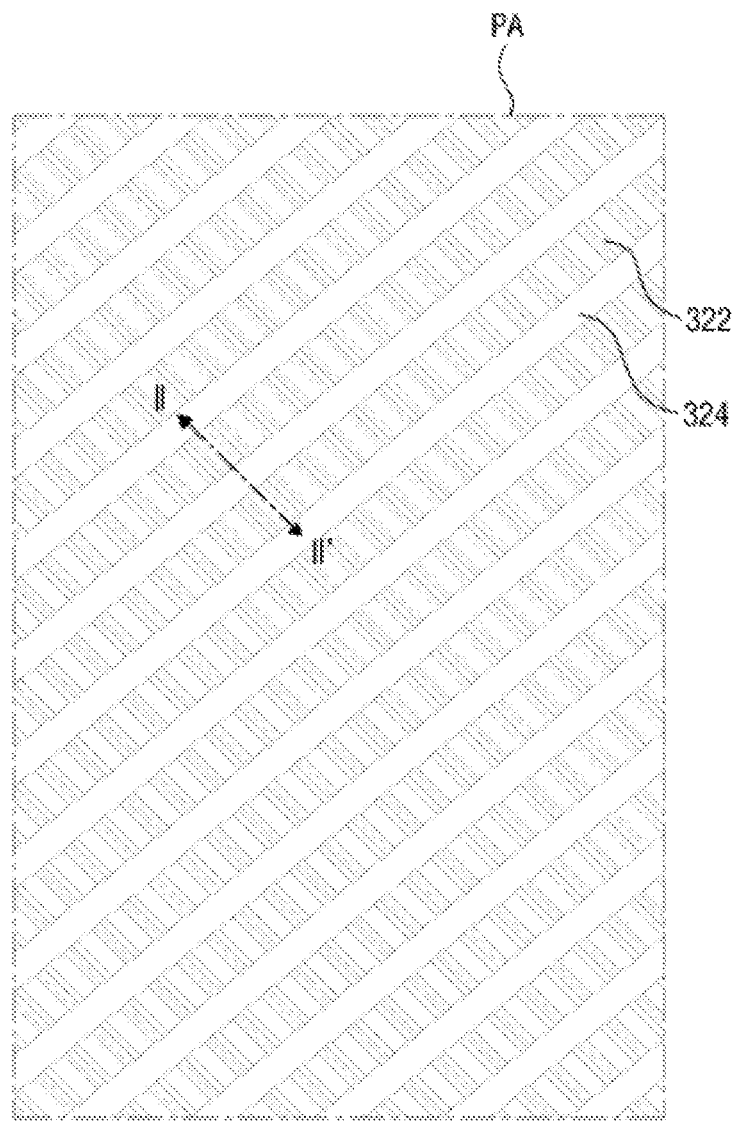
FIG. 4 is a schematic layout view (or plan view) of (a portion of) an optical layer disposed in the pixel of FIG. 2 according to an embodiment.
Figure 5:
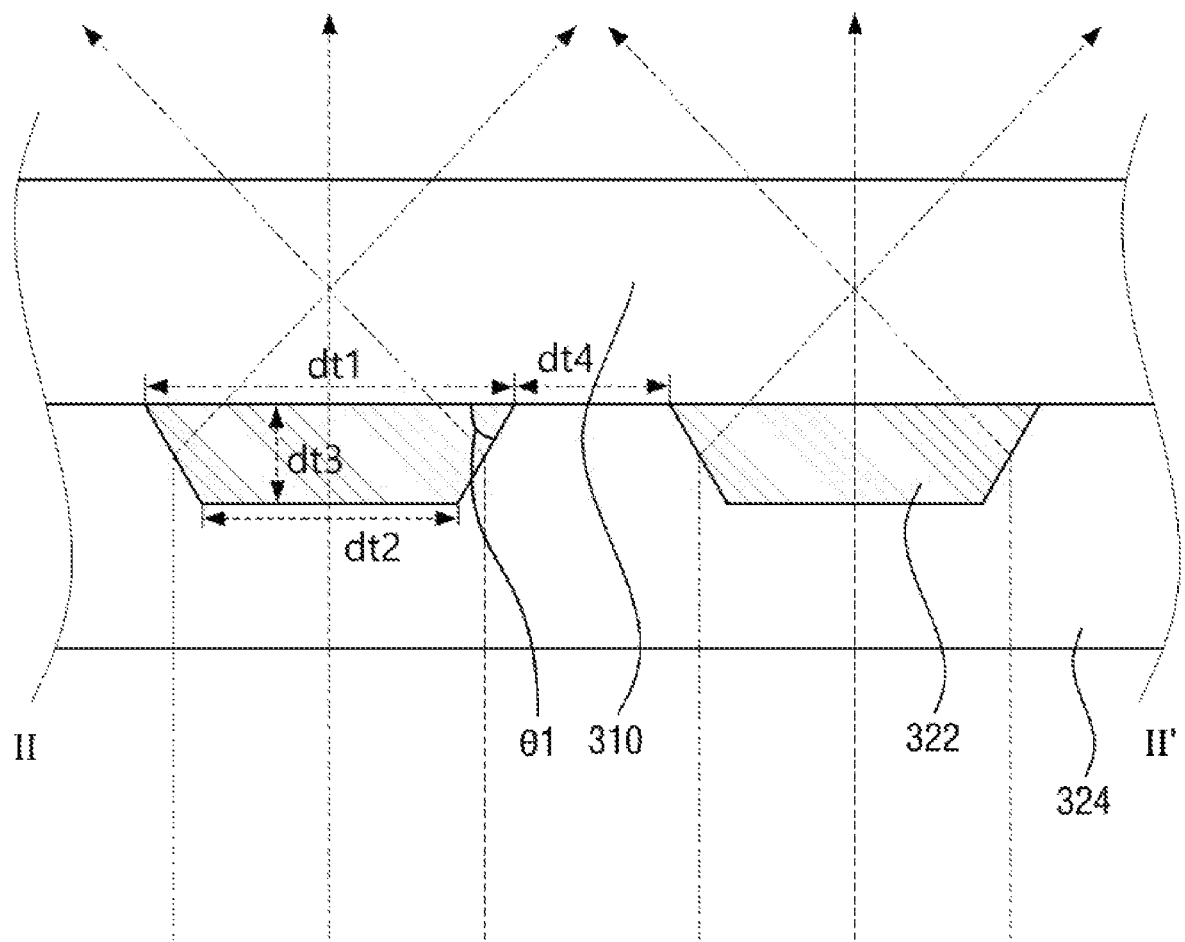
FIG. 5 is a schematic cross-sectional view taken along the line II-II' of FIG. 4 according to an embodiment.

FIG. 2 is a schematic layout view of the pixel PX illustrated in FIG. 1 according to an embodiment. FIG. 3 is a cross-sectional view taken along the line I-I' of FIG. 2 according to an embodiment. FIG. 4 is a schematic layout view of (a portion of) an optical layer disposed in the pixel PX of FIG. 2 according to an embodiment. FIG. 5 is a schematic cross-sectional view taken along the line II-II' of FIG. 4 according to an embodiment.

More specifically, FIG. 2 shows a layout view of a pixel area PA in which one pixel PX is disposed.

The pixel area PA includes an active area AA which is an area for controlling light received from the backlight unit BLU to be emitted through the display panel 10.

Referring to FIGS. 2 through 5, the display panel 10 includes the first display substrate 100, the second display substrate 300, and the liquid crystal layer 200 disposed between the first display substrate 100 and the second display substrate 300. In an embodiment, the display panel 10 may further include a pair of polarizers (not illustrated) attached to outer surfaces of the first display substrate 100 and the second display substrate 300 or disposed between the first display substrate 100 and the second display substrate 300.

A switching device, for example, a TFT 167 for changing the arrangement of liquid crystals LC included in the liquid crystal layer 200 is disposed in the first display substrate 100. The second display substrate 300 overlaps the first display substrate 100.

The liquid crystal layer 200 may be interposed between the first display substrate 100 and the second display substrate 300 and may include the liquid crystals LC having dielectric anisotropy. When an electric field is applied between the first display substrate 100 and the second display substrate 300, the liquid crystals LC may rotate/orient in a specific direction between the first display substrate 100 and the second display substrate 300 to transmit or block light. The term "rotate" may denote not only that the liquid crystals LC actually rotate, but also that the arrangement of the liquid crystals LC is changed by the electric field.

The first display substrate 100 includes a first base substrate 110. The first base substrate 110 may be a transparent insulating substrate. For example, the first base substrate 110 may be a glass substrate, a quartz substrate, a transparent resin substrate, or the like.

In some embodiments, the first base substrate 110 may be curved along a direction. In some embodiments, the first base substrate 110 may have flexibility. That is, the first base substrate 110 can be rolled, folded, bent, or the like.

A gate line 122, a gate electrode 124, and a storage line 126 are disposed on the first base substrate 110.

The gate line 122 carries a gate signal for controlling the TFT 167. The gate line 122 may extend in the first direction DR1. Whether the TFT 167 will be turned on or off may be controlled according to the voltage level of the gate signal.

The gate electrode 124 may protrude from the gate line 122 and may be physically/directly connected to the gate line 122. The gate electrode 124 may be one element of the TFT 167.

The storage line 126 does not overlap each gate line 122. The storage line 126 extends generally along the second direction DR2. In an embodiment, the storage line 126 extends along edges of the active area AA, and it may include a portion that extends along the first direction DR1. The storage line 126 may be disposed adjacent to (and spaced from) an edge of a pixel electrode 180 or may overlap an edge of the pixel electrode 180. A predetermined capacitance may be formed between the pixel electrode 180 and the storage line 126. Therefore, a sharp drop in the level of a voltage applied to the pixel electrode 180 can be prevented. In an embodiment, if the level of the voltage applied to the pixel electrode 180 drops to a level that does not adversely affect display quality or to an acceptable level in the absence of the storage line 126, the storage line 126 may be unnecessary.

The gate line 122, the gate electrode 124, and the storage line 126 may be made of the same material. For example, the gate line 122, the gate electrode 124 and the storage line 126 may be made of an aluminum (Al)-based metal such as aluminum or an aluminum alloy, a silver (Ag)-based metal such as silver or a silver alloy, a copper (Cu)-based metal such as copper or a copper alloy, a molybdenum (Mo)-based metal such as molybdenum or a molybdenum alloy, chrome (Cr), tantalum (Ta), or titanium (Ti). Each of the gate line 122, the gate electrode 124 and the storage line 126 may have a single layer structure or may have a multilayer structure including at least two conductive films with different physical properties.

A gate insulating layer 130 is disposed on the gate line 122, the gate electrode 124, and the storage line 126. The gate insulating layer 130 may be made of an insulating material such as silicon nitride or silicon oxide. The gate insulating layer 130 may have a single layer structure or may have a multilayer structure including two insulating films with different physical properties.

A first semiconductor pattern 142 and a second semiconductor pattern 144 are disposed on the gate insulating layer 130.

The first semiconductor pattern 142 may at least partially overlap the gate electrode 124. A channel for electrically connecting a source electrode 165 and a drain electrode 166 may be formed in the first semiconductor pattern 142.

Although not illustrated in the drawings, ohmic contact members may be additionally disposed on the first semiconductor pattern 142 in some embodiments. The ohmic contact members may be made of n+ hydrogenated amorphous silicon doped with an n-type impurity at a high concentration or may be made of silicide. The ohmic contact members may be disposed in a pair on the first semiconductor pattern 142. The ohmic contact members may be disposed between the source and drain electrodes 165 and 166 and the first semiconductor pattern 142, so that the source and drain electrodes 165 and 166 and the first semiconductor pattern 142 can have ohmic contact characteristics. When the first semiconductor pattern 142 includes an oxide semiconductor, the ohmic contact members may be unnecessary.

The second semiconductor pattern 144 overlaps a data line 162, the source electrode 165 and the drain electrode 166. The second semiconductor pattern 144, the data line 162, the source electrode 165 and the drain electrode 166 may be formed using the same mask process.

The first semiconductor pattern 142 and the second semiconductor pattern 144 may be made of amorphous silicon, polycrystalline silicon, or oxide semiconductor.

A first data line 162, a second data line 163, the source electrode 165 and the drain electrode 166 are disposed on the first semiconductor pattern 142, the second semiconductor pattern 144, and the gate insulating layer 130.

The first data line 162 and the second data line 163 may extend in the second direction DR2 and may intersect the gate line 122. The first data line 162 and the second data line 163 may correspond to an immediately neighboring pairs of the data lines DL1 through DLn illustrated in FIG. 1.

The first data line 162 and the second data line 163 may be insulated from the gate line 122 and the gate electrode 124 by the gate insulating layer 130.

The first data line 162 may provide a data signal to the source electrode 165 of the pixel PX illustrated in FIG. 2. The second data line 163 may provide a data signal to a source electrode of a pixel not illustrated in FIG. 2. The gray level of each pixel PX may change according to the voltage level of the data signal.

The source electrode 165 may branch from the first data line 162 and at least partially overlap the gate electrode 124.

As illustrated in FIG. 2, the source electrode 165 may be spaced apart from the drain electrode 166 by a predetermined distance and may surround the drain electrode 166 in a 'U' shape. In embodiments, the source electrode 165 and the drain electrode 166 may be shaped like bars spaced apart from each other by a predetermined distance and disposed parallel to each other. The source electrode 165 and the drain electrode 166 can be designed such that they have portions facing each other with a predetermined gap between them.

The first data line 162, the second data line 163, the source electrode 165 and the drain electrode 166 may be made of the same material. In an example, the first data line 162, the second data line 163, the source electrode 165, and the drain electrode 166 may be made of aluminum, copper, silver, molybdenum, chromium, titanium, tantalum, or an alloy of some of these materials. In addition, the first data line 162, the second data line 163, the source electrode 165 and the drain electrode 166 may have a multilayer structure composed of a lower layer (not illustrated) made of a refractory metal and an upper layer (not illustrated) made of a material with low resistivity.

The gate electrode 124, the first semiconductor pattern 142, the source electrode 165 and the drain electrode 166 may constitute the TFT 167 which is a switching device.

A passivation layer 171 is disposed on the gate insulating layer 130 and the TFT 167. The passivation layer 171 may be made of an inorganic insulating material and may cover the TFT 167. The passivation layer 171 may protect the TFT 167 and prevent materials contained in a color filter layer 172 and in elements disposed on the color filter layer 172 from flowing into the first semiconductor pattern 142 and the second semiconductor pattern 144. In some embodiments, the passivation layer 171 may be unnecessary.

The color filter layer 172 is disposed on the passivation layer 171. The color filter layer 172 may be a photosensitive organic composition containing a pigment for realizing a color and may include a red, green, or blue pigment. In an example, the color filter layer 172 may include a plurality of color filters. In an example, each of the color filters may display a primary color, e.g., one of red, green, and blue. In an embodiment, one or more of the color filters may display one or more of cyan, magenta, yellow, and white colors.

A planarization layer 173 is disposed on the color filter layer 172. The planarization layer 173 may be made of an insulating material. For example, the planarization layer 173 may be an organic film made of an organic material. The planarization layer 173 may planarize local steps formed by elements disposed between the planarization layer 173 and the first base substrate 110. In other words, an upper surface of the planarization layer 173 may be substantially flat. However, in some embodiments, an upper surface of the color filter layer 172 may be formed substantially flat. In this case, the planarization layer 173 may be unnecessary. In some embodiments, elements to be described below may be stacked on the color filter layer 172 without planarizing the upper surface of the color filter layer 172.

A contact hole CNT may be formed in the passivation layer 171, the color filter layer 172, and the planarization layer 173. The contact hole CNT may partially expose the TFT 167, more specifically, may partially expose an upper surface of the drain electrode 166 along a direction perpendicular to an upper surface of the first base substrate 110. The contact hole CNT may pass through the passivation layer 171, the color filter layer 172, and the planarization layer 174.

The pixel electrode 180 is disposed on the planarization layer 174. The pixel electrode 180 may be physically connected to the drain electrode 166 via the contact hole CNT and may receive the data voltage from the drain electrode 166.

The pixel electrode 180 may be made of a transparent conductive material such as indium tin oxide (ITO), indium zinc oxide (IZO), indium tin zinc oxide (ITZO), or Al-doped zinc oxide (AZO).

The pixel electrode 180 may generally be disposed within the active area AA but may include an area extended to overlap the contact hole CNT for connection with the drain electrode 166.

The pixel electrode 180 includes a stem electrode 181, a plurality of branch electrodes 182, and an extension electrode 183. Further, slits SL are provided, each being an opening which is formed between the branch electrodes 182 facing each other and in which a transparent conductive material is not disposed. The slits SL may cause a regular pattern to be formed in the pixel electrode 180, and the direction and degree of tilting of the liquid crystals 210 overlapped by the pixel electrode 180 may be controlled by the shape and pattern of the pixel electrode 180.

Each element of the pixel electrode 180 may be disposed inside the active area AA. However, as an exception, the extension electrode 183 may be disposed outside the active area AA as described above.

The stem electrode 181 may include a section extending along the first direction DR1 and a section extending along the second direction DR2. In an embodiment, the stem electrode 181 is structured to extend along the edges of the active area AA. Since the liquid crystals LC generally tilt toward a direction in which the stem electrode 181 is disposed, they may collide with each other in the stem electrode 181, thereby generating a texture. Therefore, the stem electrode 181 may be placed to extend along the edges of the active area AA instead of extending across a central portion of the active area AA, so that a reduction in transmittance due to the stem electrode 181 can be minimized.

Further, some sections of the stem electrode 181, more specifically, sections extending in the same direction as the direction in which the first data line 162 and the second data line 163 extend may be arranged to overlap the first data line 162 and the second data line 163, thereby minimizing a reduction in transmittance. In an embodiment, since a section of the stem electrode 181 extending along the second direction DR2 is placed to overlap the data line 162, a reduction in transmittance due to the stem electrode 181 can be minimized.

The branch electrodes 182 may extend from the stem electrode 181 in a direction oblique to both the first direction DR1 and the second direction DR2, that is, in a direction not parallel to both the first direction DR1 and the second direction DR2.

In particular, the branch electrodes 182 may extend toward the same direction. In an embodiment, a structure in which the branch electrodes 182 extend in a direction toward a lower right corner in FIG. 2 is described. When the branch electrodes 182 are formed to extend toward the same direction, the slits SL formed between the branch electrodes 182 also extend toward one direction. Since the branch electrodes 182 are arranged over most of the active area AA, the liquid crystals LC may tilt toward the same direction in the active area AA. In an embodiment, the liquid crystals LC arranged in the active area AA may be generally parallel to the direction in which the branch electrodes 182 extend and may tilt toward the direction in which the stem electrode 181 is disposed, that is, toward an upper left corner in FIG. 2.

In an embodiment, when the branch electrodes 182 extend toward the same direction, it means that the branch electrodes 182 arranged in 80% or more of the active area in which the branch electrodes 182 extend in the same direction. In particular, when the branch electrodes 182 extend in the same direction, a corresponding pixel PX may be defined as having one domain with the majority of corresponding liquid crystal molecules having substantially the same orientation/behavior. That is, even if some of the branch electrodes 182 (for example, the branch electrodes 182 arranged in less than 20% of the active area AA) extend in different directions, if the branch electrodes 182 arranged in 80% of the active area AA extend in the same direction, it can be said that the branch electrodes 182 disposed in a corresponding pixel area PA extend in the same direction and that a corresponding pixel PX has one domain of the liquid crystal layer.

When a pixel PX has one domain, most of the liquid crystals LC in the active area AA are controlled to tilt in substantially the same direction. Therefore, collisions between liquid crystals LC can be minimized, thus generation of unwanted texture may be minimized or prevented. Accordingly, embodiments can improve the transmittance of the corresponding pixel PX and enhance the transmittance of the LCD 1000.

The extension electrode 183 protrudes out of the active area AA. The extension electrode 183 may be connected to the stem electrode 181 or the branch electrodes 182 and may overlap the contact hole CNT. The extension electrode 183 may be physically connected to the drain electrode 166 via the contact hole CNT and may receive a data signal. The data signal provided to the extension electrode 183 may be transmitted to the stem electrode 181 and the branch electrodes 182 constituting the pixel electrode 180 via the extension electrode 183.

A first alignment layer (not illustrated) may be additionally disposed on the pixel electrode 180. The first alignment layer may control an initial alignment angle of the liquid crystals LC included in the liquid crystal layer 200. In some embodiments, the first alignment layer may be unnecessary.

The second display substrate 300 includes a second base substrate 310, a plurality of optical patterns 322, a first overcoat layer 324, a light shielding member 330, a second overcoat layer 340, and a common electrode 350.

The second base substrate 310 is placed to face the first base substrate 110. The second base substrate 310 may have durability to withstand external impacts. The second base substrate 310 may be a transparent insulating substrate. For example, the second base substrate 310 may be a glass substrate, a quartz substrate, a transparent resin substrate, or the like. The second base substrate 310 may be a flat plate, but can be curved in a specific direction.

The optical patterns 322 are disposed on a surface of the second base substrate 310 that faces the first display substrate 100, and the first overcoat layer 324 is disposed (directly) on surfaces of the optical patterns 322 which face the first display substrate 100 and is disposed (directly) on side surfaces of the optical patterns 322.

The optical patterns 322 may be disposed on most of the surface of the second base substrate 310 that faces the first display substrate and may protrude from the second base substrate 310 toward first display substrate 100.

The first overcoat layer 324 may planarize steps formed by the optical patterns 322. Therefore, the surface of the combination of the first overcoat layer 324 and the optical patterns 322 facing the first display substrate 100 may be substantially flat, as seen in FIG. 3.

Light provided from the backlight unit BLU below the optical patterns 322 and the first overcoat layer 324 is diffused at a boundary between the optical patterns 322 and the first overcoat layer 324. Therefore, an exit angle of the light is greater than an incident angle of the light.

Light passing through the boundary between the optical patterns 322 and the first overcoat layer 324 can travel in various directions, which can increase viewing angle and improve visibility.

As described above, in an embodiment, each pixel PX may include only/exactly one domain. In an embodiment, most of the liquid crystals LC disposed in the active area AA may be controlled to tilt generally along the same direction.

In an embodiment, light can be diffused at the interface between the optical patterns 322 and the first overcoat layer 324 because of the difference between refractive indices of the two layers and because of sloping sidewalls of the optical pattern 322. Thus, visibility can be improved. Each pixel PX can have satisfactory transmittance by having only one domain and, at the same time, can provide satisfactory visibility using the optical patterns 322 and the first overcoat layer 324.

In an embodiment, the refractive index of the material that forms the optical patterns 322 may be relatively greater than that of the material that forms the first overcoat layer 324. In an example, the refractive index of the optical patterns 322 may be in a range of about 1.8 to about 2.0, and the refractive index of the first overcoat layer 324 may be in a range of about 1.6 or less.

The optical patterns 322 may be shaped like bars extending parallel to each other in a direction oblique to the first direction DR1 and the second direction DR2, as illustrated in FIG. 4. In addition, the optical patterns 322 may intersect the branch electrodes 182 in a plan view of the LCD.

In an embodiment, the optical patterns 322 may be perpendicular to the branch electrodes 182 in a plan view of the LCD. In an embodiment, a length dt1 of an upper side of each of the optical patterns 322 is greater than a length dt2 of a lower side as illustrated in FIG. 5, and the visibility improving effect of the optical patterns 322 can be maximized. In an embodiment, a taper angle θ1, which is an example of internal angles formed by the sidewalls of the optical pattern 322 and the second base substrate 310, is 90 degrees or less, the visibility improving effect can be maximized.

In an embodiment, the length dt1 of the upper side of each of the optical patterns 322 may denote a width of an upper surface of each optical pattern 322 measured in a direction perpendicular to the extension direction of each optical pattern 322, and the length d2 of the lower side of each of the optical pattern 322 may denote a width of a lower surface of each optical pattern 322 measured in the direction perpendicular to the extension direction of each optical pattern 322.

In an example, the length dt1 of the upper side of each of the optical patterns 322 may be in a range of about 2 μm to about 10 μm, and the length dt2 of the lower side of each of the optical patterns 322 may be determined within a range smaller than the length d1 of the upper side. In an embodiment, a height dt3 of each of the optical patterns 322 may be in a range of about 0.5 μm to about 5 μm, and a gap dt4 between every two immediately neighboring optical patterns 322 may be in a range of about 0.3 μm to about 3 μm.

The optical patterns 322 may be made of an inorganic insulating material such as silicon nitride (SiNx) or silicon oxide (SiOx). In embodiments, the optical patterns 322 can be made of a suitable material that can form the shape of the optical patterns 322 and can transmit light.

The first overcoat layer 324 may be made of an organic insulating material that can planarize steps formed by the optical patterns 322.

The light shielding member 330 is disposed on a surface of the first overcoat layer 324 which faces the first display substrate 100. The light shielding member 330 may overlap the gate line 122, the first data line 162, the second data line 163, the TFT 167 and the contact hole CNT, that is, overlap an area other than the active area AA and may block transmission of light in the area other than the active area AA.

The second overcoat layer 340 is disposed on a surface of the light shielding member 330 which faces the first display substrate 100. The second overcoat layer 340 can reduce steps formed by the light shielding member 330. In some embodiments, the second overcoat layer 340 may be unnecessary.

The common electrode 350 is disposed on a surface of the second overcoat layer 340 which faces the first display substrate 100.

The common electrode 350 may be made of a transparent conductive material such as indium tin oxide (ITO), indium zinc oxide (IZO), indium tin zinc oxide (ITZO), or Al-doped zinc oxide (AZO).

The common electrode 350 may be formed as a whole plate over the entire surface of the second base substrate 310. A common signal provided from the outside may be transmitted to the common electrode 350. Thus, the common electrode 350 may form an electric field in the liquid crystal layer 200 together with the pixel electrode 180.

In an embodiment, the difference between the voltage levels of the common signal and the data signal can be controlled as intended. Therefore, an electric field for controlling the tilt of the liquid crystals LC can be formed in a space between the pixel electrode 180 and the common electrode 350 arranged to overlap each other.

A second alignment layer (not illustrated) may be additionally disposed on a surface of the common electrode 350 which faces the first display substrate 100. The second alignment layer may control the initial alignment angle of the liquid crystals LC included in the liquid crystal layer 200. In some embodiments, the second alignment layer may be unnecessary.

The liquid crystal layer 200 includes a plurality of liquid crystals LC having dielectric anisotropy and refractive index anisotropy. In a state where no electric field is formed in the liquid crystal layer 200, the liquid crystals LC may be arranged in a direction perpendicular to the first display substrate 100 and the second display substrate 300. When an electric field is formed between the first display substrate 100 and the second display substrate 300, the liquid crystals LC may rotate or tilt in a specific direction between the first display substrate 100 and the second display substrate 300 to change the polarization of light.

Figure 6:
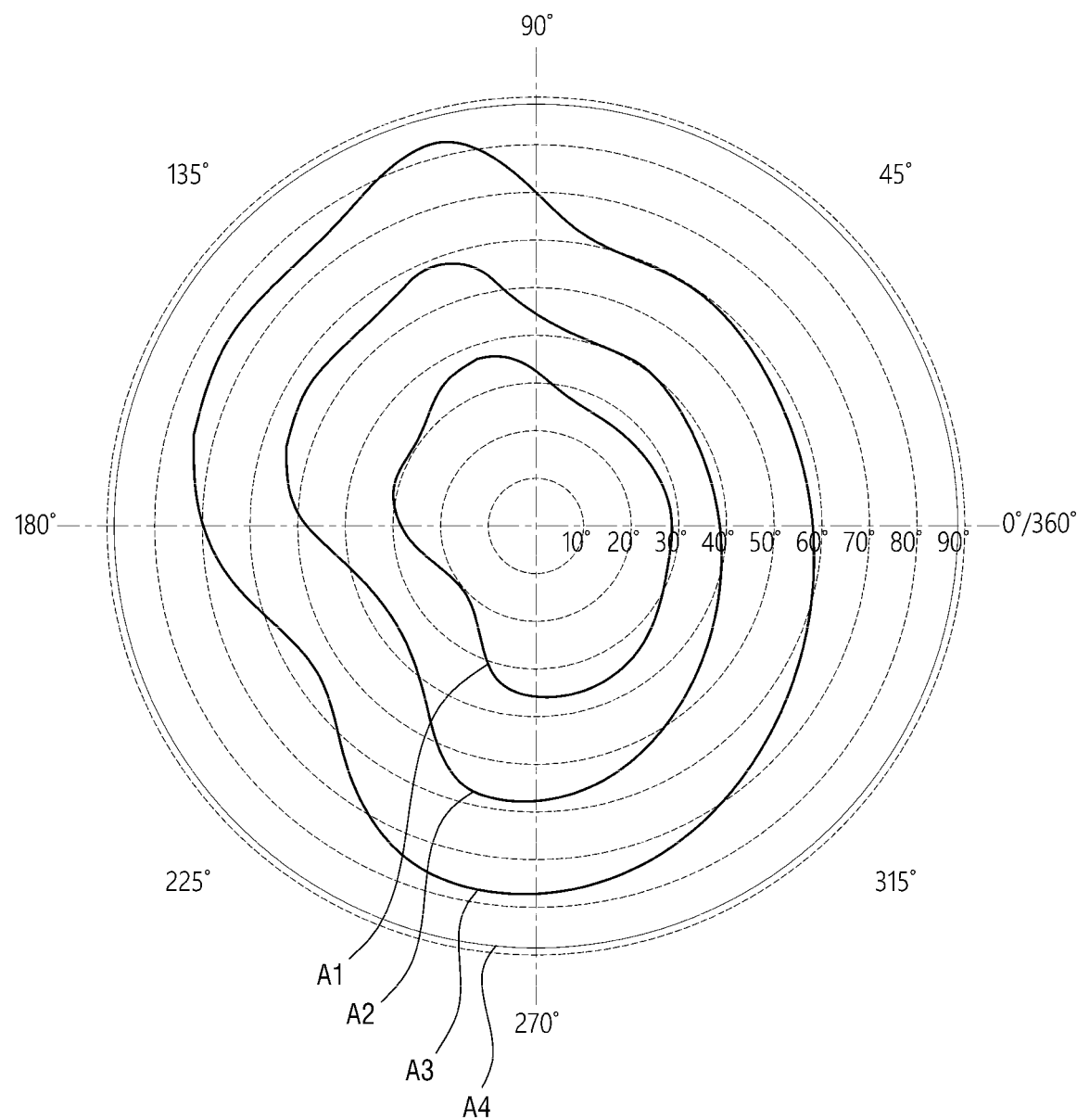
FIG. 6 is a graph illustrating brightness (e.g., image brightness) of an LCD according to one or more embodiments (e.g., one or more embodiments discussed with reference to one or more of FIGS. 1 through 5) at various observation positions.
Figure 7:
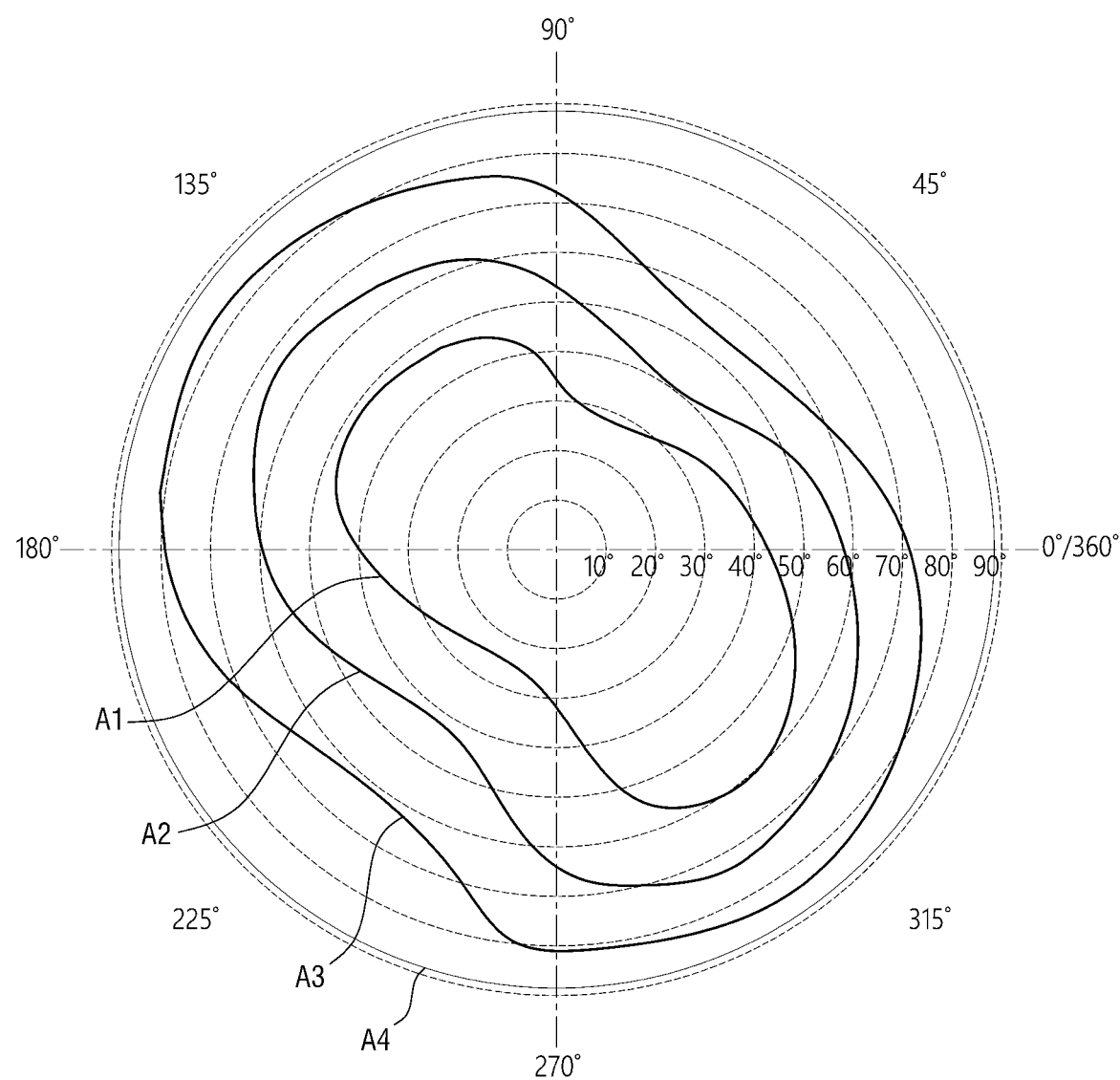
FIG. 7 is a graph illustrating brightness (e.g., image brightness) of an LCD according to a comparative example embodiment at various observation positions.

FIG. 6 is a graph illustrating brightness (e.g., image brightness) of the LCD 1000 of FIGS. 1 through 5 at various observation positions, and FIG. 7 is a graph illustrating brightness (e.g., image brightness) of an LCD according to a comparative example embodiment at various observation positions.

The comparative example embodiment of FIG. 7 is related to an LCD that does not include the optical patterns 322 (see FIG. 3) described with reference to one or more of FIGS. 1 through 5.

In the graphs of FIGS. 6 and 7, the angles of 0 to 360 degrees shown along the outside of an outermost circle indicated by a dotted line represent the directions in which the LCDs are observed, and the angles of 0 to 90 degrees shown to correspond respectively to circles indicated by dotted lines represent the angles at which the LCDs are observed. In addition, in the graphs of FIGS. 6 and 7, assuming that a maximum value of brightness observed after a specific image is displayed on an LCD is 100%, a first area A1 denotes an area observed with a brightness of about 75% to about 100%, a second area A2 denotes an area observed with a brightness of about 50% to about 75%, a third area A3 denotes an area observed with a brightness of about 25% to about 50%, and a fourth area A4 denotes an area observed with a brightness of about 0% to about 25%.

Comparing the graphs of FIGS. 6 and 7 shows that the first through fourth areas A1 through A4 illustrated in FIG. 6 are closer to a circular shape than the first through fourth areas A1 through A4 illustrated in FIG. 7, respectively. In other words, the LCD 1000 related to the graph of FIG. 6 has a smaller difference in brightness according to the observation direction and observation angle than the LCD according to the comparative example related to the graph of FIG. 7. That is, the LCD 1000 including the optical patterns 322 (see FIG. 3) has better visibility than the LCD according to the comparative example embodiment.

Figure 8:
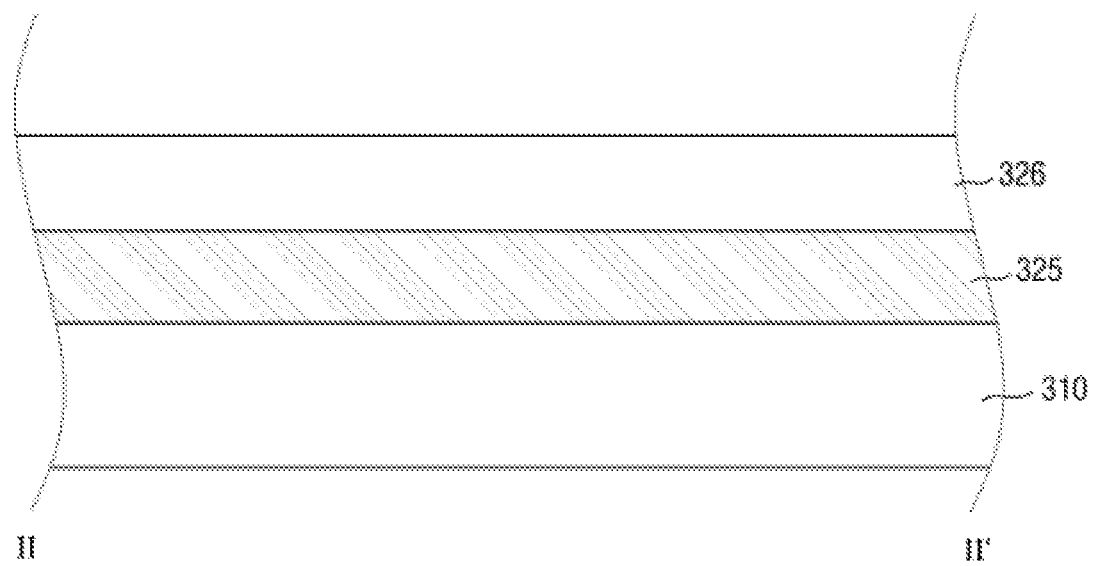
FIG. 8, FIG. 9, and FIG. 10 are cross-sectional views illustrating structures formed in a method of manufacturing an LCD according to one or more embodiments (e.g., one or more embodiments described with reference to one or more of FIGS. 1 through 5).
Figure 9:
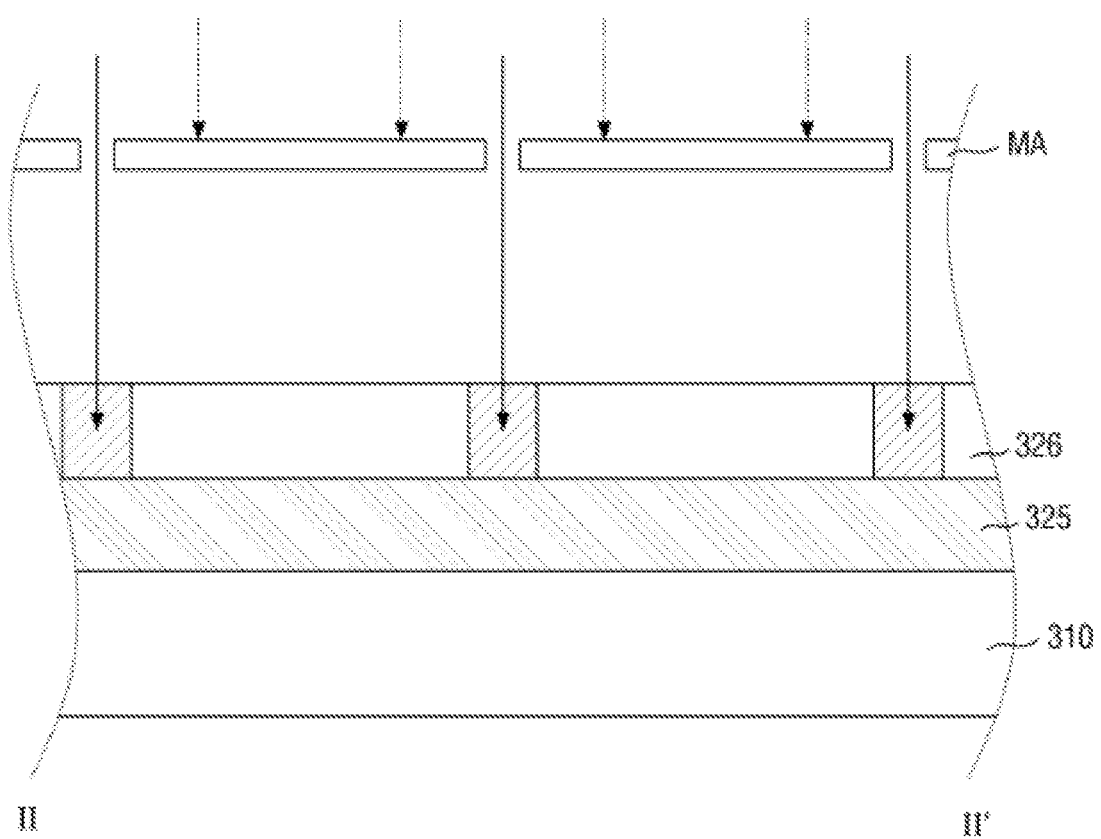
Figure 10:
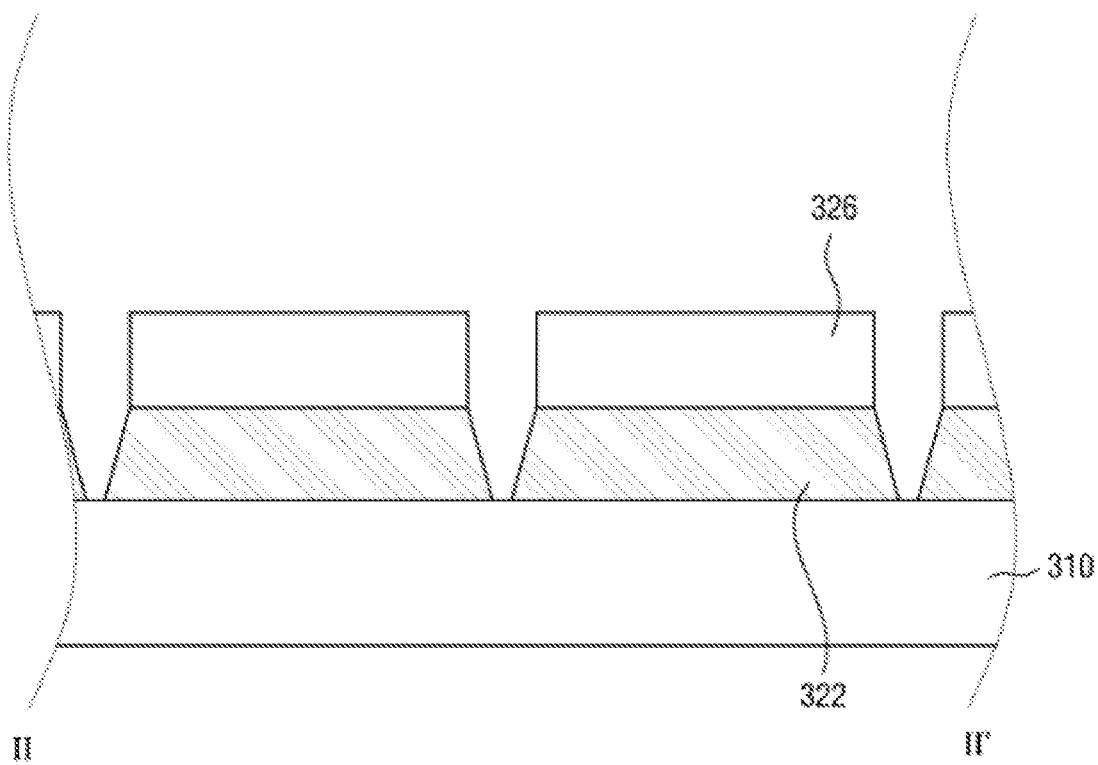

FIGS. 8 through 10 are cross-sectional views illustrating structures formed in a method of manufacturing an LCD. e.g., an LCD 1000 described with reference to one or more of FIGS. 1 through 5.

For the sake of convenience, in FIGS. 8 through 10, a method of manufacturing the optical patterns 322 will be described using cross-sections taken along the line II-II' of FIG. 4.

First, referring to FIG. 8, a second base substrate 310 is prepared. An optical pattern material layer 325 is placed on the prepared second base substrate 310. The optical pattern material layer 325 may be made of an inorganic insulating material such as silicon nitride (SiNx) or silicon oxide (SiOx), as described above. Then, a photoresist material layer 326 is applied onto the optical pattern material layer 325.

Next, referring to FIG. 9, after a photomask MA is placed above the photoresist material layer 326, areas corresponding to spaces between optical patterns 322 (see FIG. 3) to be formed later are exposed. In an embodiment, a photosensitive resin used to form patterns in the photoresist material layer 326 may be, but is not limited to, of a positive type.

Next, referring to FIG. 10, the exposed areas of the photoresist material layer 326 are removed using a developer, and the exposed areas of the optical pattern material layer 325 are removed using a dry etching process to form the optical patterns 322. In an embodiment, the slope of sidewalls of the optical patterns 322 can be adjusted by controlling the time spent on the dry etching process. For example, as the time spent on the dry etching process increases, the sidewalls of the optical pattern 322 may be formed closer to a direction perpendicular to a plane on which the second base substrate 310 is disposed.

Further, if the dry etching process is continued even after the sidewalls of the optical patterns 322 are formed to be perpendicular to the plane on which the second base substrate 310 is disposed, the sidewalls of the optical pattern 322 may be formed to have an inverted slope. The optical patterns 322 having such a shape will be described later.

Finally, the optical patterns 322 are completed by removing the remaining photoresist material layer 326, and patterns for diffusing light are formed by applying a first overcoat layer 324 onto the optical patterns 322.

Figure 11:
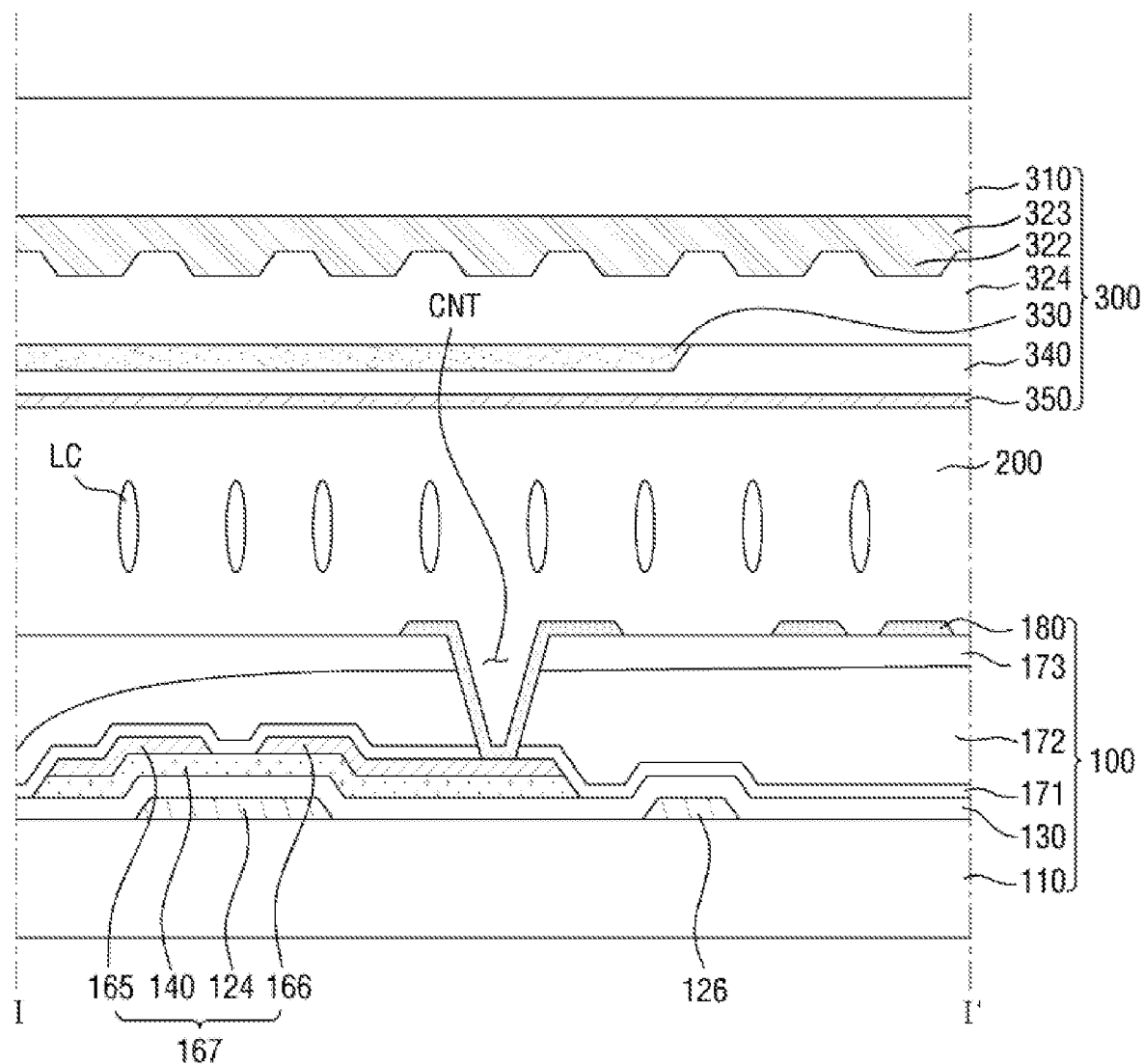
FIG. 11 is a cross-sectional view of an LCD taken along a line corresponding to the line I-I' of FIG. 2 according to an embodiment.

FIG. 11 is a cross-sectional view of an LCD according to an embodiment, taken along a line corresponding to the line I-I' of FIG. 2.

In the following description, features different from those of the elements and reference numerals described above with reference to FIGS. 1 through 5 will be described, but description related to identical features may not be repeated.

Referring to FIG. 11, a display panel 10 includes a first display substrate 100, a liquid crystal layer 200, and a second display substrate 300. In comparison with structures described with reference to FIGS. 1 through 5, the second display substrate 300 further includes a base layer 323 made of the same material as optical patterns 322.

Figure 12:
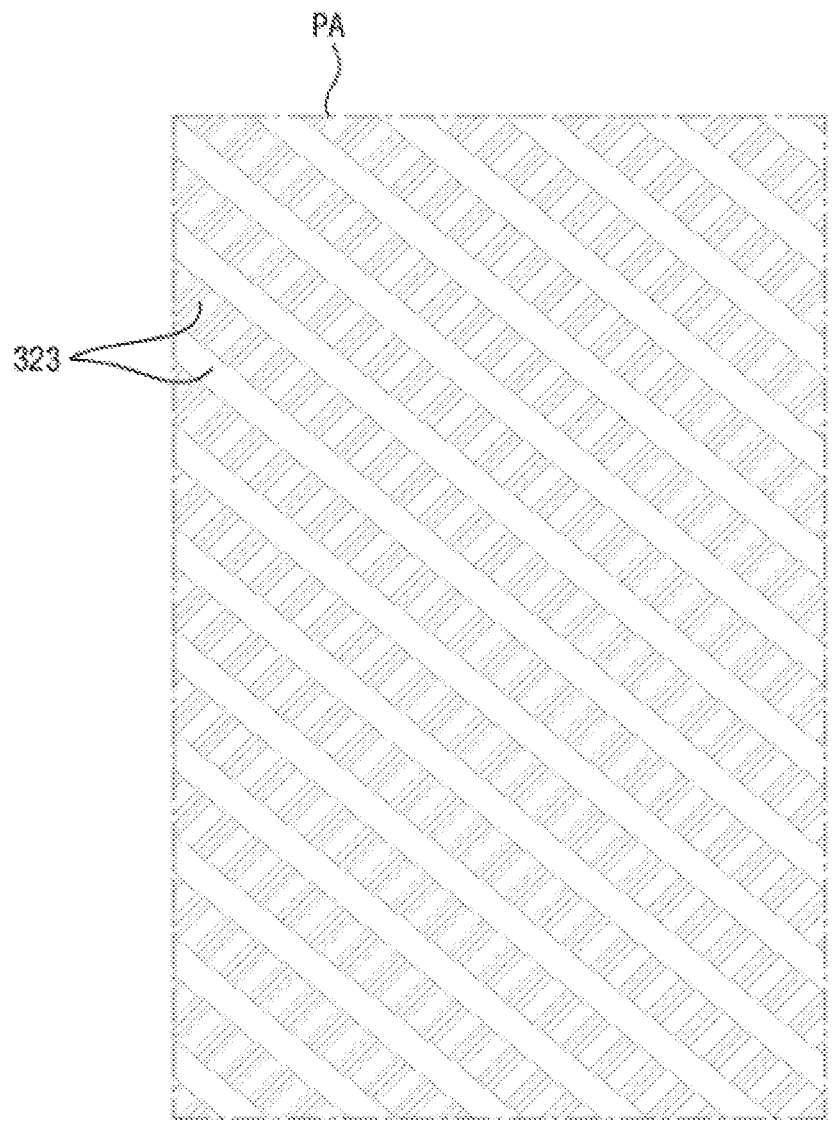
FIG. 12 is a schematic layout view (or plan view) of (a portion of) an optical layer disposed in a pixel of an LCD according to an embodiment.
Figure 13:
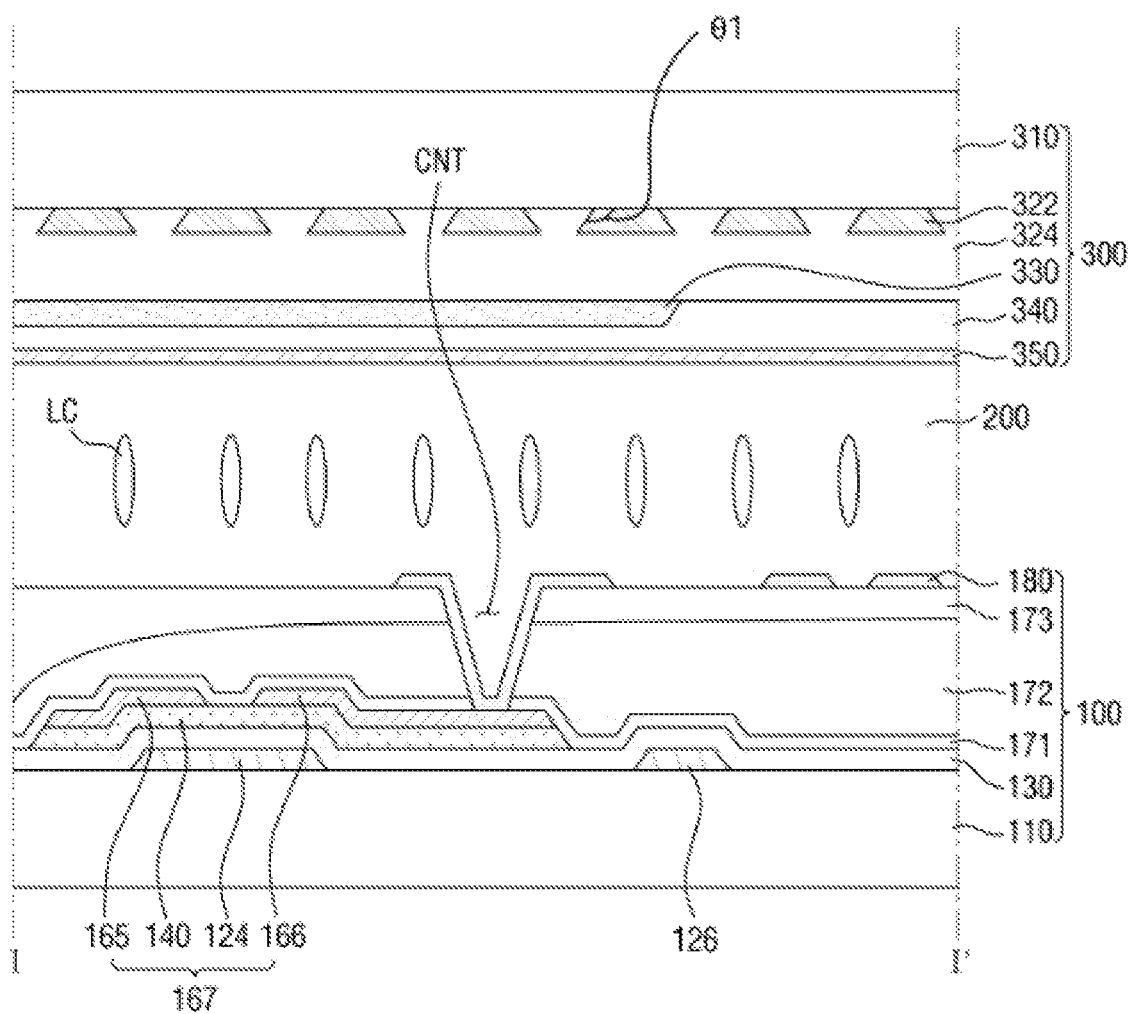
FIG. 13 is a cross-sectional view of an LCD taken along a line corresponding to the line I-I' of FIG. 2 according to an embodiment.

FIG. 12 is a schematic layout view of an optical layer disposed in a pixel of an LCD according to an embodiment, and FIG. 13 is a cross-sectional view of the LCD of FIG. 12, taken along a line corresponding to the line I-I' of FIG. 2.

Referring to FIGS. 12 and 13, a display panel 10 according to an embodiment includes a first display substrate 100, a liquid crystal layer 200, and a second display substrate 300. In comparison with structures described with reference to FIGS. 1 through 5, the second display substrate 300 includes optical patterns having a taper angle θ1 of greater than 90 degrees.

That is, a length of an upper side of each optical pattern 322 is smaller than a length of a lower side based on FIG. 13.

In addition, the optical patterns 322 may extend parallel to branch electrodes 182.

In an embodiment, the taper angle θ1 of the optical patterns 322 is greater than 90 degrees, the optical patterns 322 extend parallel to the branch electrodes 182, and the visibility improving effect can be maximized.

Figure 14:
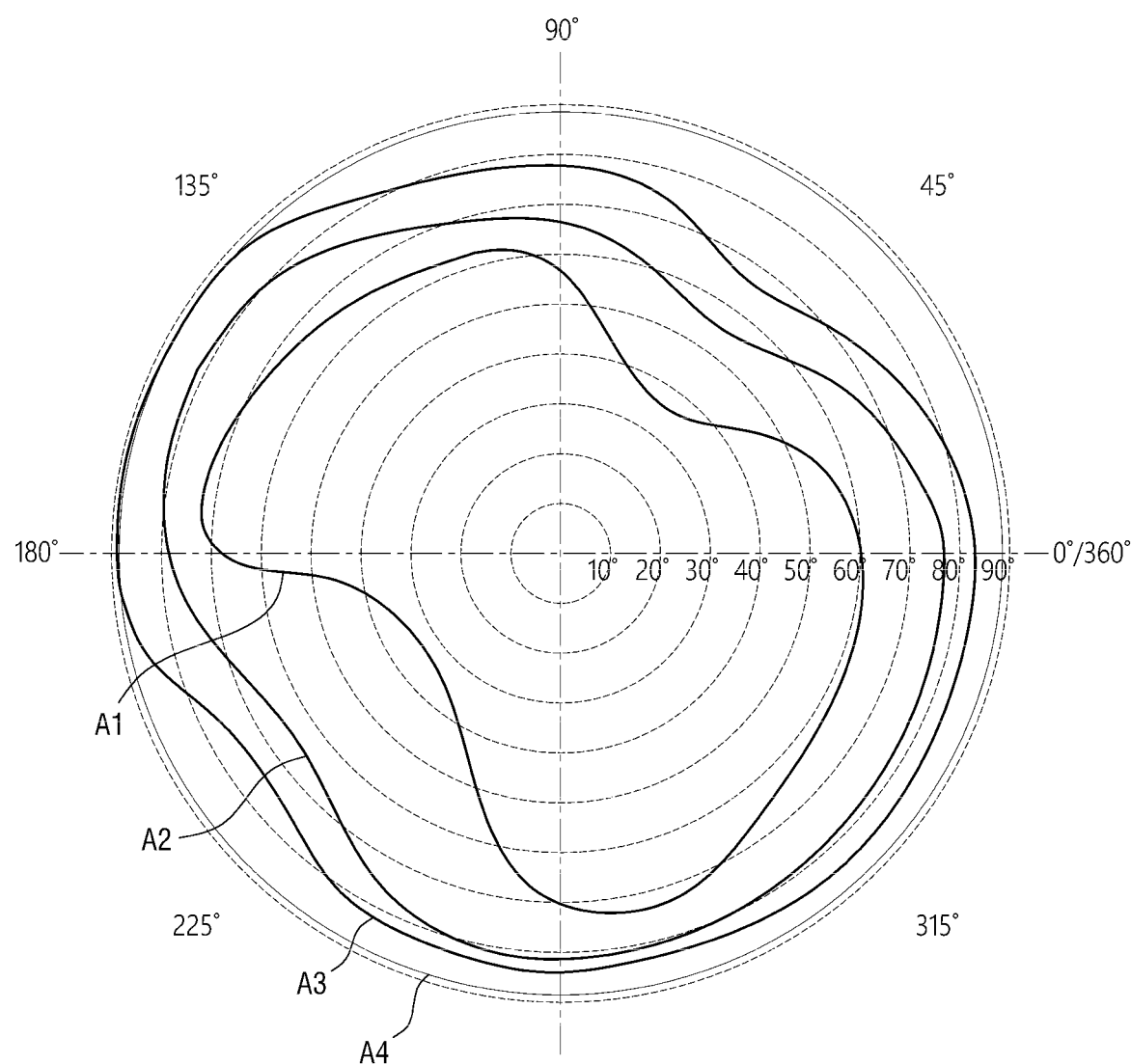
FIG. 14 is a graph illustrating brightness (e.g., image brightness) of an LCD according to one or more embodiments (e.g., one or more embodiments described with reference to one or more of FIGS. 12 and 13) at various observation positions.

FIG. 14 is a graph illustrating brightness (e.g., image brightness) of the LCD of FIGS. 12 and 13 at each observation position.

If the graph of FIG. 14 is compared with the graph of FIG. 7 (which is related to data according to the above-described comparative example embodiment), it can be seen that the first through fourth areas A1 through A4 illustrated in FIG. 14 are closer to a circular shape than the first through fourth areas A1 through A4 illustrated in FIG. 7, respectively. Therefore, the LCD 1000 related to FIGS. 12 and 13 has a smaller difference in brightness according to the observation direction and observation angle than the LCD according to the comparative example embodiment related to the graph of FIG. 7. That is, the LCD 1000 related to FIGS. 12 and 13 has better visibility than the LCD according to the comparative example embodiment.

Furthermore, it can be seen that the proportion of the first area A1 in the entire area is larger in the graph of FIG. 14 than in the graph of FIG. 6. Therefore, it can be understood that the LCD 1000 related to FIGS. 12 and 13 has relatively better transmittance than the LCD 1000 related to FIGS. 1 through 5.

Figure 15:
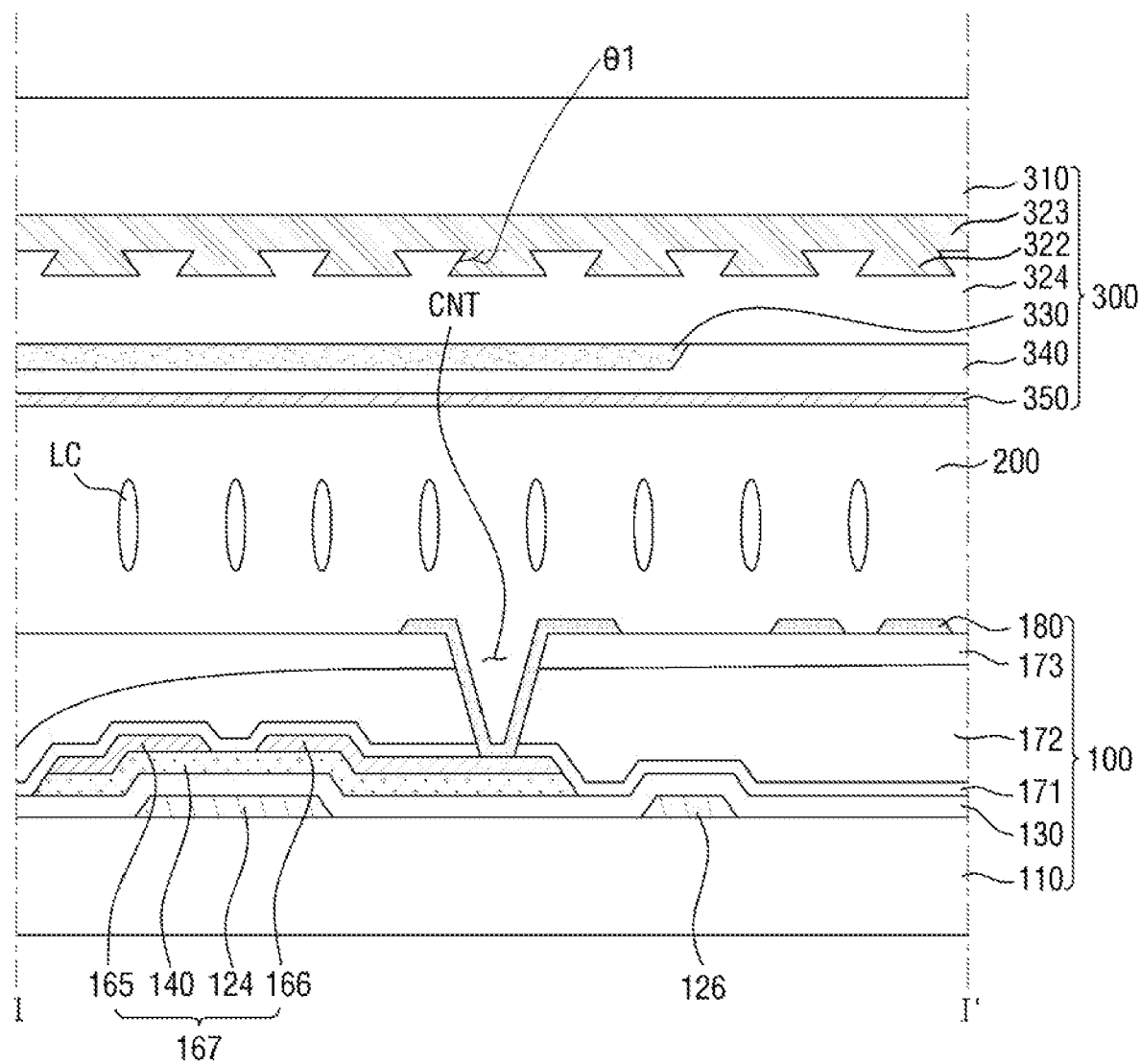
FIG. 15 is a cross-sectional view of an LCD taken along a line corresponding to the line I-I' of FIG. 2 according to an embodiment.

FIG. 15 is a cross-sectional view of an LCD taken along a line corresponding to the line I-I' of FIG. 2 according to an embodiment.

Referring to FIG. 15, a display panel 10 includes a first display substrate 100, a liquid crystal layer 200, and a second display substrate 300. In comparison with structures described with reference to FIGS. 12 and 13, the second display substrate 300 further includes a base layer 323 made of the same material as optical patterns 322.

Figure 16:
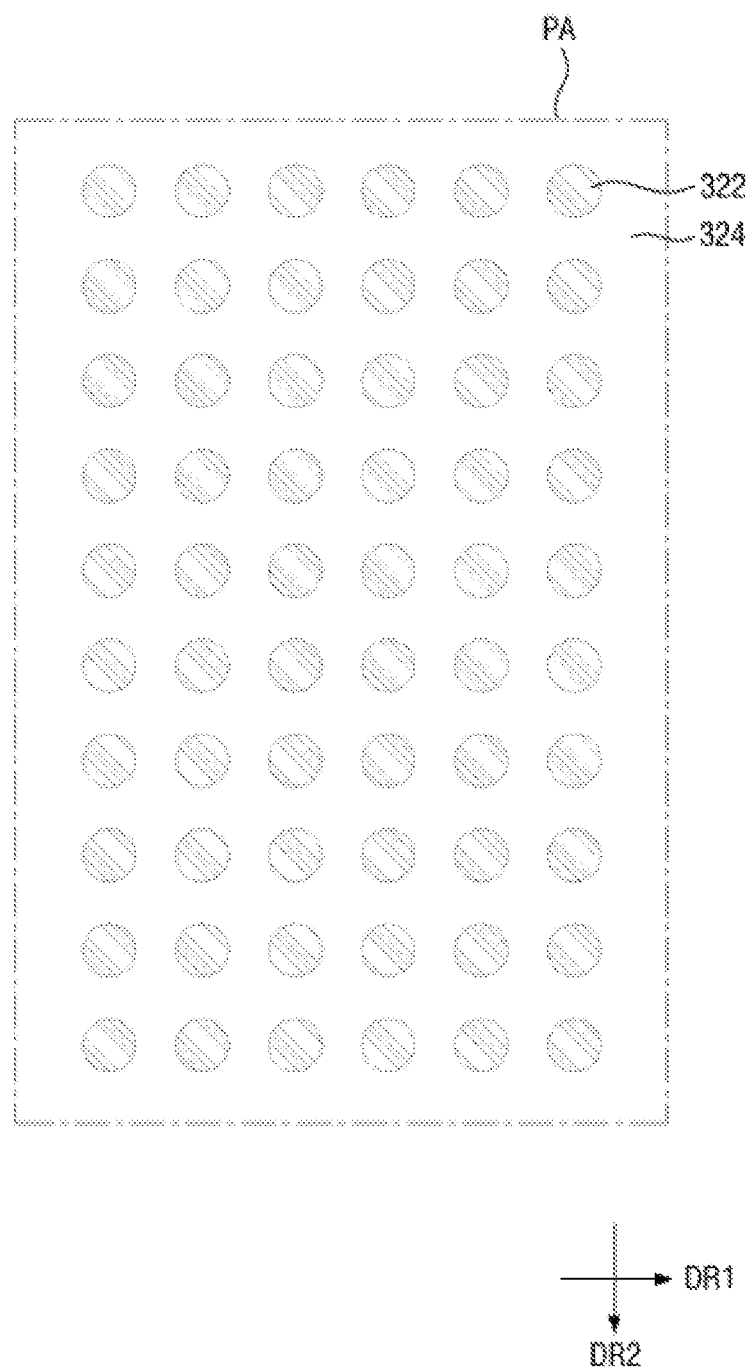
FIG. 16 is a schematic layout view (or plan view) of (a portion of) an optical layer disposed in a pixel of an LCD according to an embodiment.
Figure 17:
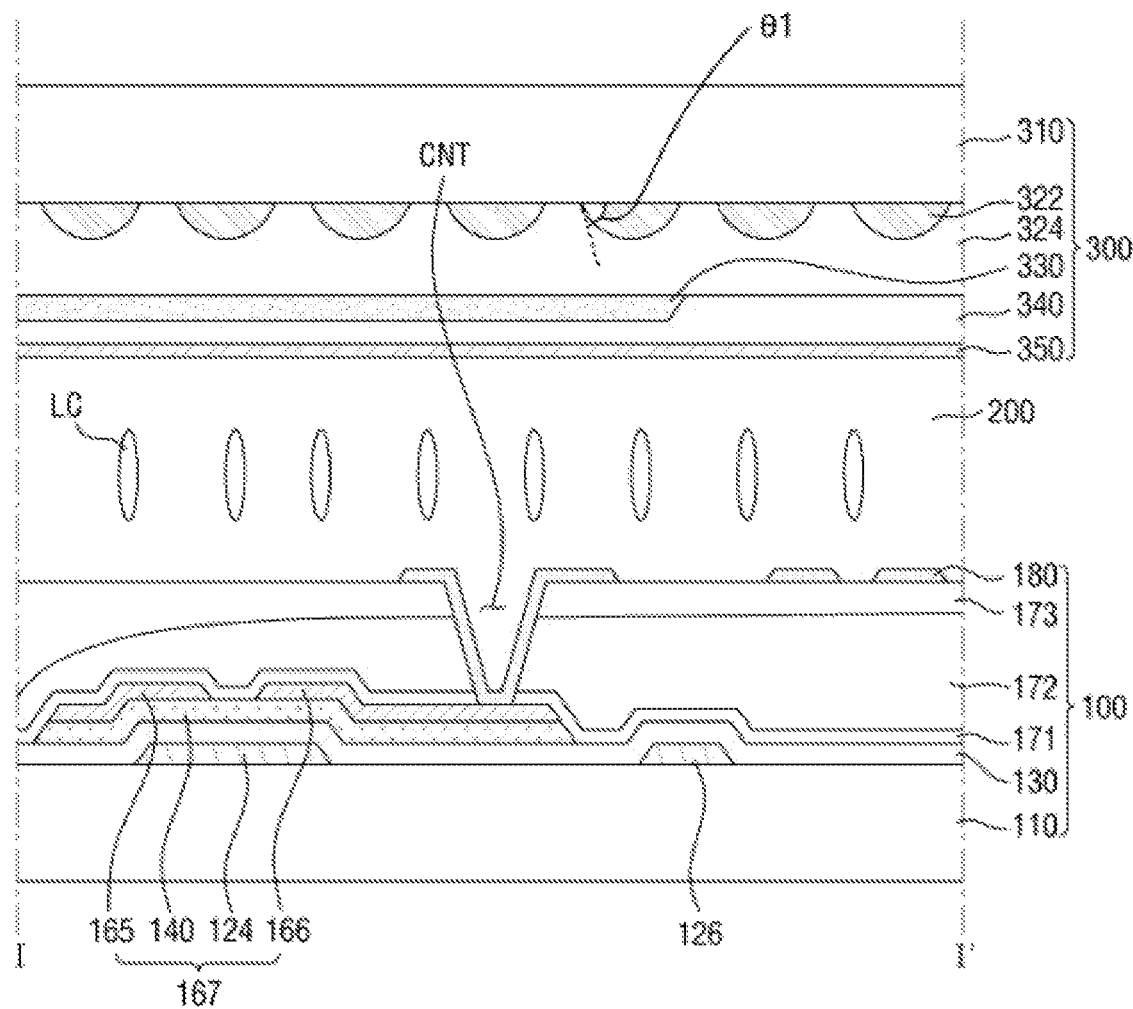
Figure 18:
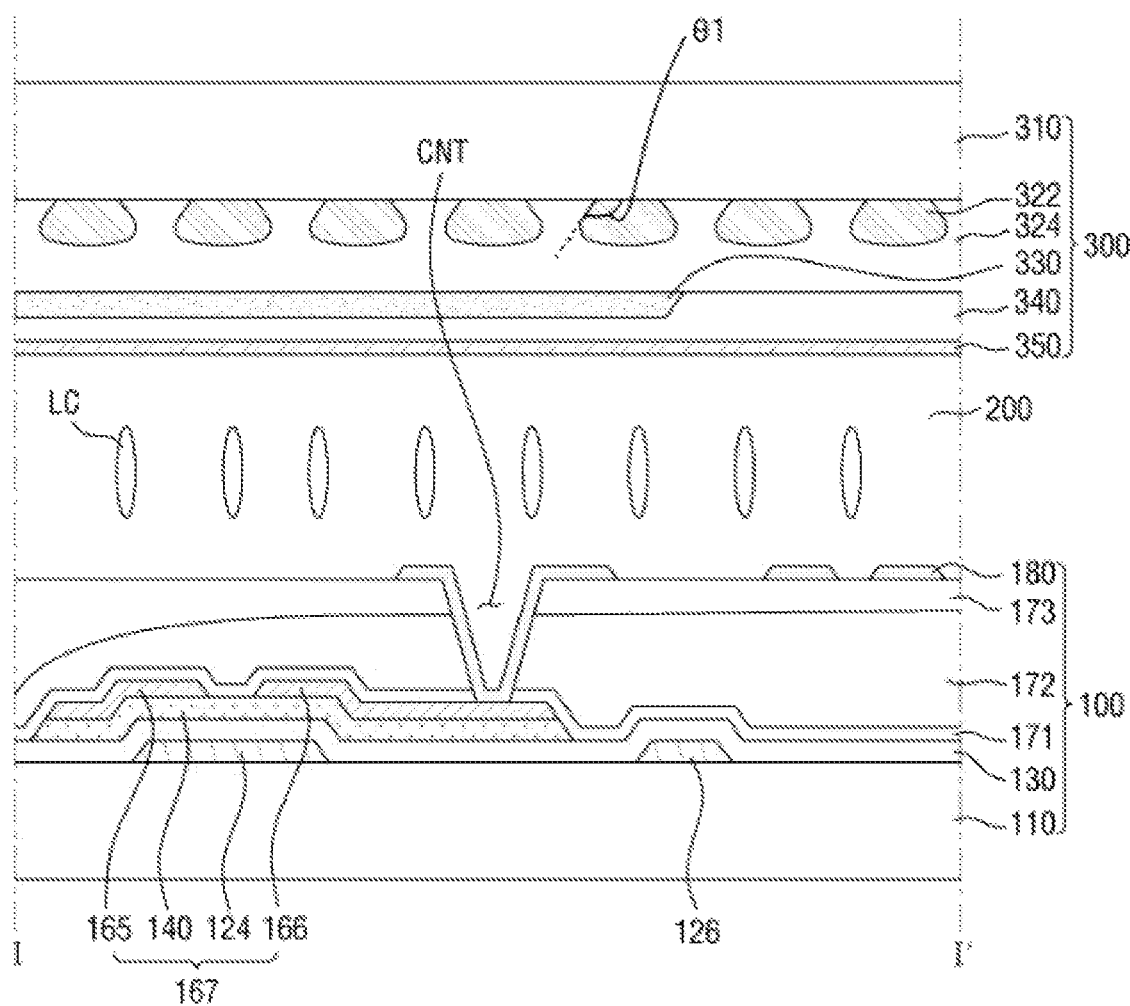
FIG. 18 is a cross-sectional view of an LCD taken along a line corresponding to the line I-I' of FIG. 2 according to an embodiment (e.g., an embodiment related to FIG. 16).

FIG. 16 is a schematic layout view of an optical layer disposed in a pixel of an LCD according to an embodiment, and each of FIG. 17 and FIG. 18 is a cross-sectional view of a LCDs taken along the line I-I' of FIG. 2 according to an embodiment (e.g., an embodiments related to FIG. 16).

Referring to FIGS. 16 and 17, a display panel 10 includes a first display substrate 100, a liquid crystal layer 200, and a second display substrate 300. Optical patterns 322 according to an embodiment are shaped like dots separated from each other, unlike the bar-shaped optical patterns 322 described with reference to one or more of FIGS. 1 through 5.

More specifically, the optical patterns 322 may be shaped like circles separated from each other in the first direction DR1 and in the second direction DR2 and may be arranged in a matrix form. In an embodiment, each of the optical patterns 322 may have a curved cross section with a taper angle θ1 of less than 90 degrees.

Referring to FIGS. 16 and 18, each optical pattern 322 may have a curved cross section with a taper angle θ1 of greater than 90 degrees.

Each of FIGS. 19 through 23 is a schematic layout view (or plan view) of an optical layer disposed in a pixel of an LCD according to one or more embodiments.

Figure 19:
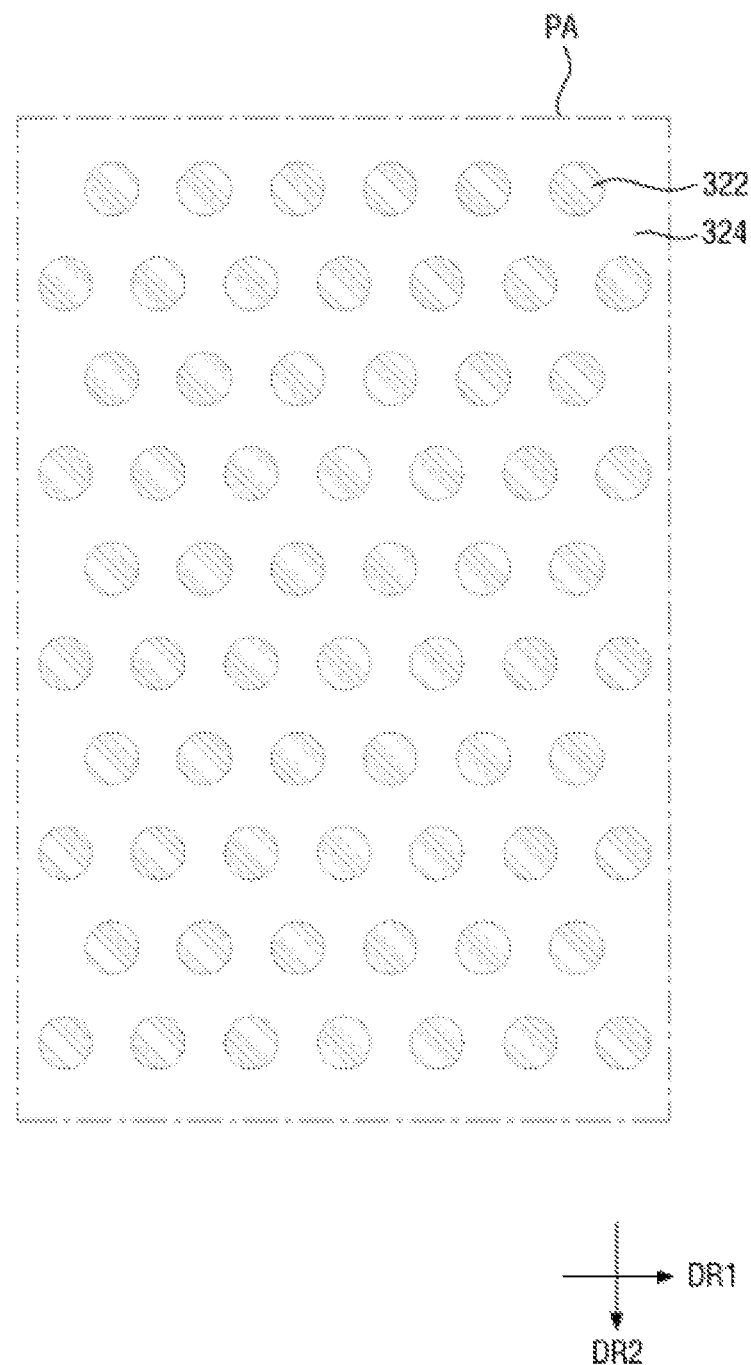

Referring to FIG. 19, optical patterns 322 according to an embodiment are shaped like separate circles as in the embodiment of FIG. 16, but are arranged in an alternate/offset manner (e.g., with two overlapping arrays), not in a single aligned matrix form as in the embodiment of FIG. 16. In an embodiment, since the optical patterns 322 are arranged at regular intervals, light can be substantially uniformly diffused, thereby maximizing visibility improvement.

Figure 20:
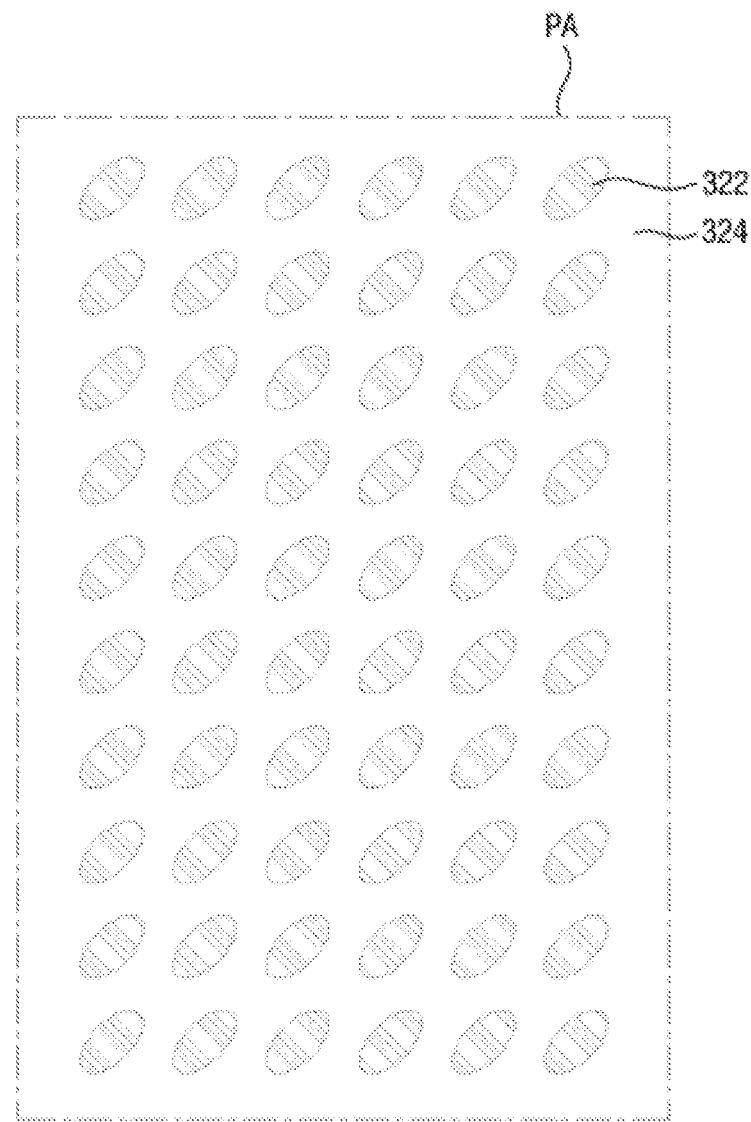
Figure 20:
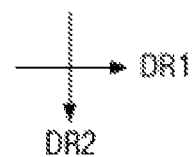

Referring to FIG. 20, optical patterns 322 according to an embodiment are elliptical, unlike in the embodiment of FIG. 16.

Figure 21:
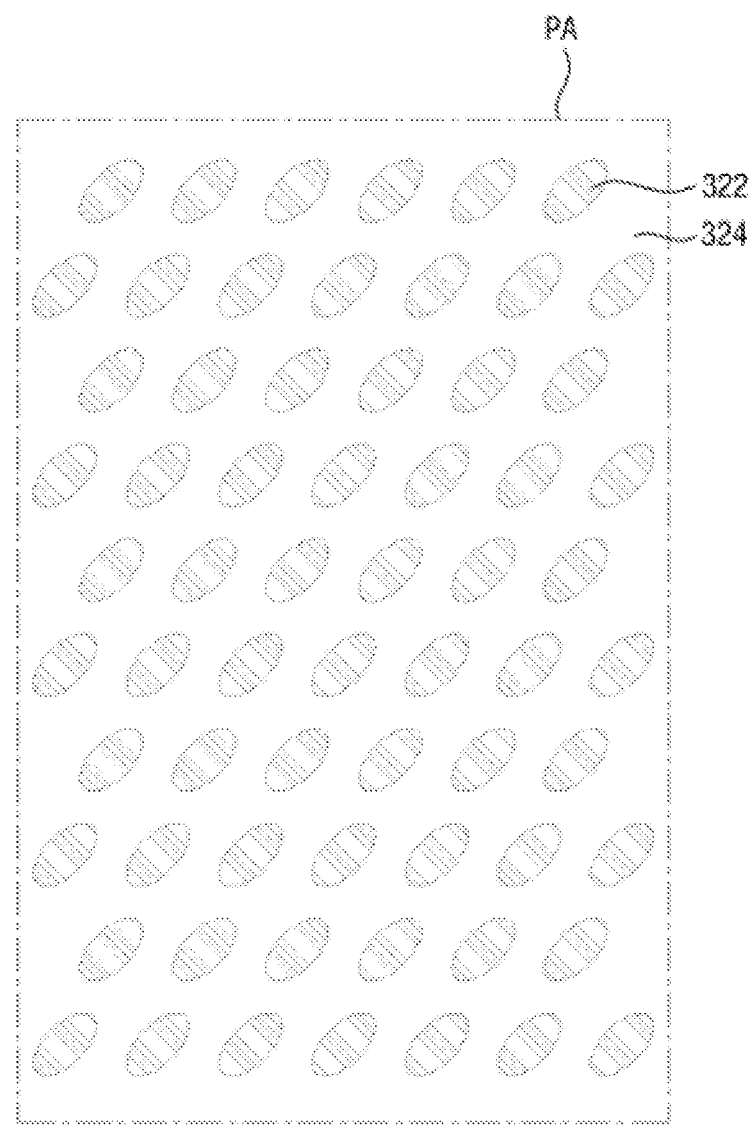

Referring to FIG. 21, optical patterns 322 according to an embodiment are elliptical as in the embodiment of FIG. 20, but are arranged in an alternate/offset manner, not in a single aligned matrix form as in the embodiment of FIG. 20. In an embodiment, since the optical patterns 322 are arranged at regular intervals, light can be more uniformly diffused, thereby maximizing visibility improvement.

Figure 22:
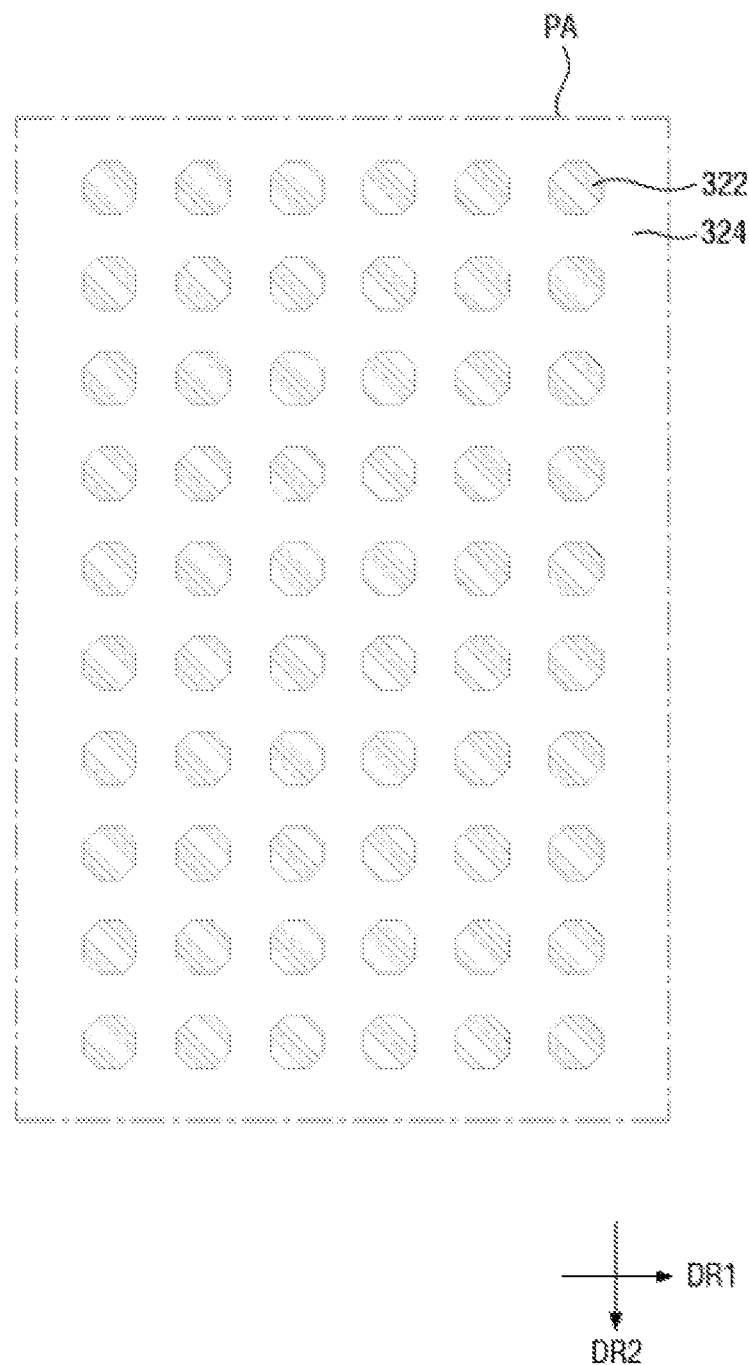

Referring to FIG. 22, optical patterns 322 according to an embodiment are polygonal, unlike in the embodiment of FIG. 16. In particular, the optical patterns 322 of FIG. 22 each may have a regular octagonal shape.

Figure 23:
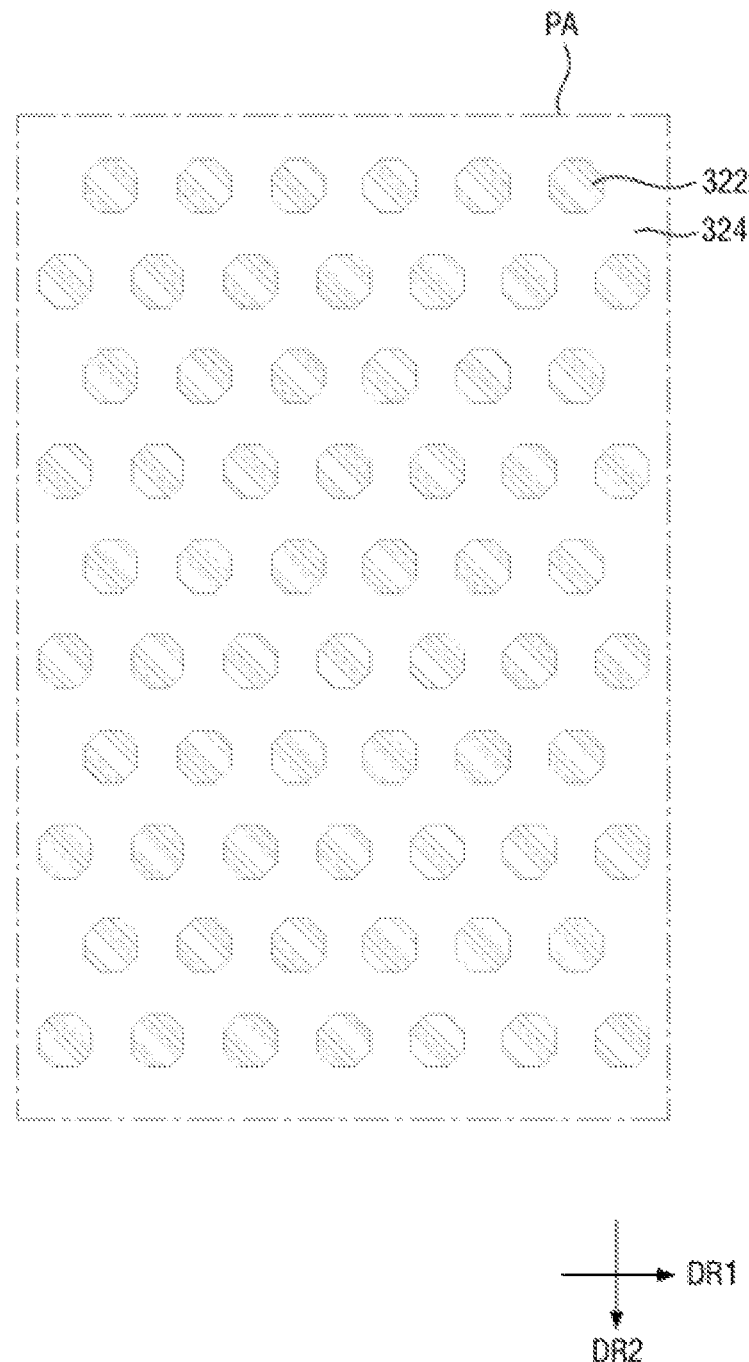
FIG. 23 is a schematic layout view (or plan view) of (a portion of) an optical layer disposed in a pixel of an LCD according to one or more embodiments.

Referring to FIG. 23, optical patterns 322 according to an embodiment are polygonal as in the embodiment of FIG. 22, but are arranged in an alternate/offset manner, not in a matrix form as in the embodiment of FIG. 22. In an embodiment, since the optical patterns 322 are arranged at regular intervals, light can be substantially uniformly diffused, thereby maximizing visibility improvement.

According to embodiments, an LCD may display images with satisfactory visibility.

Practical embodiments are not limited to the described example embodiments. The scope of practical embodiments is defined by the claims.

What is claimed is:

1. A display device comprising:
   a first substrate;
   a pixel electrode overlapping the first substrate;
   a second substrate overlapping the first substrate and including a surface facing the first substrate;
   a plurality of optical members configured for diffusing light and disposed directly on the surface of the second substrate, having identical structures, and protruding toward the first substrate;
   an overcoat layer directly contacting the optical members, covering the optical members, positioned between the first substrate and the optical members, and including a surface facing the first substrate;
   a light shielding member disposed directly on the surface of the overcoat layer and overlapping at least three consecutive optical members among the optical members; and
   a liquid crystal layer disposed between the pixel electrode and the overcoat layer,
   wherein the pixel electrode defines one domain of the liquid crystal layer,
   wherein the at least three consecutive optical members among the optical members are disposed between the light shielding member and the second substrate,
   wherein the optical members are made of an inorganic insulating material,
   wherein the pixel electrode comprises a first stem electrode extending in a first direction, a second stem electrode extending in a second direction perpendicular to the first direction, and a plurality of branch electrodes extending from at least one of the first stem electrode and the second stem electrode, and
   wherein each of the optical members extends in a same oblique direction with respective to a data line disposed on the first substrate and is perpendicular or parallel to the branch electrodes.

2. The display device of claim 1, wherein the pixel electrode corresponds to an active area in which light transmittance of a corresponding portion of the liquid crystal layer is controlled, and wherein the branch electrodes extend in the same direction in 80% or more of the active area.

3. The display device of claim 1, wherein, in a plan view of the display device, the optical members are bar structures disposed parallel to each other.

4. The display device of claim 3, wherein the optical members extend perpendicular to the branch electrodes in the plan view of the display device.

5. The display device of claim 3, wherein the optical members extend parallel to the branch electrodes.

6. The display device of claim 1, wherein, in a plan view of the display device, the optical members are spaced from each other a first direction and in a second direction.

7. The display device of claim 6, wherein the optical members include at least one of circular members, elliptical members, and polygonal members in the plan view of the display device.

8. The display device of claim 1, wherein the data line extends in at least one of the first direction and the second direction and partially overlaps at least one of the first stem electrode and the second stem electrode.

9. The display device of claim 1, wherein a refractive index of the optical members is greater than a refractive index of the overcoat layer.

10. The display device of claim 1, wherein a first the surface of the overcoat layer is substantially flat.

11. The display device of claim 1, further comprising:
    a gate line disposed on the first substrate; and
    two data lines immediately neighboring each other with no intervening data line, intersecting the gate line in a plan view of the display device, and insulated from the gate line,
    wherein at least one of the two data lines partially overlaps the pixel electrode.

12. The display device of claim 1, wherein the optical members include a plurality of bars disposed parallel to each other, wherein the optical members extend perpendicular to the branch electrodes, and wherein internal angles formed by the sidewalls of the optical members and the second substrate each exceed 90 degrees.

13. The display device of claim 1,
    wherein the plurality of branch electrodes extend in a direction different from the first direction and the second direction, and
    wherein the pixel electrode overlaps at least two optical members of the plurality of optical members.

* * * * *